(12) United States Patent
Fleming et al.

(10) Patent No.: US 11,676,204 B1
(45) Date of Patent: Jun. 13, 2023

(54) SYSTEMS FOR AUTOMATED DIGITAL-PROPERTY ANALYSIS

(71) Applicant: AON RISK SERVICES, INC. OF MARYLAND, New York, NY (US)

(72) Inventors: Samuel Cameron Fleming, Spokane, WA (US); Daniel Crouse, Seattle, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 233 days.

(21) Appl. No.: 16/439,440

(22) Filed: Jun. 12, 2019

(51) Int. Cl.
*G06Q 40/00* (2023.01)
*G06Q 40/04* (2012.01)
*G06F 16/27* (2019.01)

(52) U.S. Cl.
CPC ............ *G06Q 40/04* (2013.01); *G06F 16/27* (2019.01)

(58) Field of Classification Search
CPC ......... G06Q 40/04; G06Q 40/00; G06F 16/27
See application file for complete search history.

(56) References Cited

U.S. PATENT DOCUMENTS

| | | | | |
|---|---|---|---|---|
| 2002/0073233 A1* | 6/2002 | Gross | ............... | H04L 61/1511 709/245 |
| 2006/0061806 A1* | 3/2006 | King | ............... | G06F 16/951 358/1.15 |
| 2008/0215474 A1* | 9/2008 | Graham | ............... | G06Q 40/04 705/37 |
| 2014/0164262 A1* | 6/2014 | Graham | ............... | G06Q 40/04 705/310 |
| 2018/0302417 A1* | 10/2018 | Wilson | ............... | G06F 16/24 |

OTHER PUBLICATIONS

Krallinger et al., "Information Retrieval and Text Mining Technologies for Chemistry," American Chemical Society (Year: 2017).*
Krallinger et al., "Information Retrieval and Text Mining Technologies for Chemistry," American Chemical Society (Year: 2017) (Year: 2017).*

* cited by examiner

*Primary Examiner* — Scott C Anderson
*Assistant Examiner* — George N. Proios
(74) *Attorney, Agent, or Firm* — Lee & Hayes, P.C.

(57) ABSTRACT

Systems and methods for automated digital-property analysis are disclosed. A document representing a digital property may be received and the document, or key elements and/or language characterizations representing the document, may be utilized to search one or more databases for similar documents. The search results may be ranked and displayed for review. If an indication that the search results do not correspond to the document is received, that indication may be utilized to promote registration of the document with a trade-secret registry, for provision of insurance policies, etc. Scheduled auditing may be established and utilized to confirm the digital property has not be disclosed and/or to determine a potential misappropriation event.

20 Claims, 9 Drawing Sheets

SYSTEMS FOR AUTOMATED DIGITAL-PROPERTY ANALYSIS

BACKGROUND

Trade secrets and other digital properties can be valuable assets to companies and individuals. However, unlike other forms of intellectual property, governmental registration and/or grant of trade secret rights is not offered. Described herein are improvements in technology and solutions to technical problems that can be used to, among other things, assist in the protection of trade secrets and/or digital properties.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
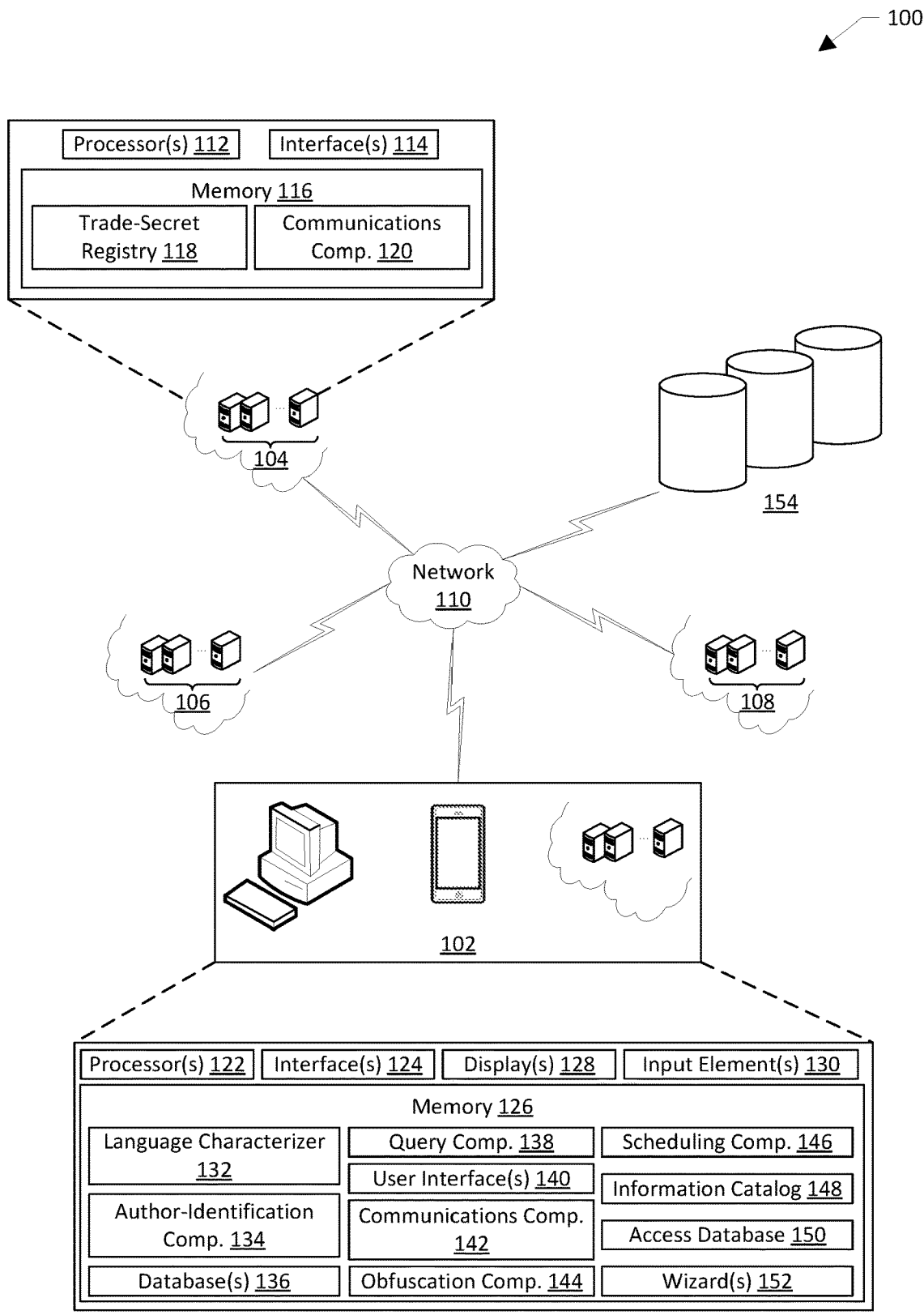
FIG. 1 illustrates a schematic diagram of an example architecture of systems for automated digital-property analysis.

Systems and methods for automated digital-property analysis are disclosed. Take, for example, a company or individual, described herein as an entity, that owns one or more intellectual property assets. While some of those intellectual property assets may be registerable by a governmental entity, such as patents and trademarks being applied for and issued by the United State Patent and Trademark Office or copyrights being registered by the United States Copyright Office, other types of intellectual property, such as trade secrets, may not be registerable by a governmental entity. Additionally, information that may not meet a particular (e.g., legal) definition of a trade secret, and/or may not meet multiple, disparate definitions of a trade secret, sometimes referred to as confidential information or know-how, may still be valuable to the entity. In these and other examples, a system that allows for the registration of such property (collectively referred to herein as "trade secret" and/or "digital property") in a way that establishes indicia of ownership, credibility of possession, or other information useful in assessing, protecting, insuring, or enforcing such property would be beneficial to such entities. As part of such registration, and/or as part of an application process for acquiring insurance coverage associated with digital property, and/or as part of an ongoing auditing process, a system that performs a search of information both internal and external to a given entity to assist in determining whether the digital property has been disclosed would be beneficial to the entity and/or an insurer.

The innovations described herein provide systems for automated digital-property analysis that, among other things, enables digital-property owners to determine whether a given digital property has been disclosed in a less-than desirable manner. For example, a digital-property owner may desire to register digital property with a digital-property registration system. As part of the registration process, and/or at some point after registration, the systems described herein may provide the ability to perform a search of databases and/or available information, whether internal and/or external to the entity registering the digital property. In examples, the systems described herein may receive a document representing the digital property. The "document" may be any data that has been indicated by a user of the system to be digital property. The document may include text data, image data, audio data, and/or other types of data, such as metadata. The systems may also be configured to determine one or more key elements and/or language characterizations of the document in question. For example, the systems may determine key elements and/or language characterizations such as key words and/or language characterizations and/or phrases associated with the subject matter of the document. Additionally, or alternatively, the systems may determine key elements and/or language characterizations such as identifiers of authors and/or creators of the document and/or subject matter associated with the document. The identifiers may include names and/or other identifying information associated with the authors and/or creators. These key elements and/or language characterizations may be displayed, such as via a user interface, for a user of the system to review and/or change and/or confirm. In other examples, the system may provide functionality that allows a user of the system to provide input corresponding to the key elements and/or language characterizations such that the user identifies the key elements and/or language characterizations.

The key elements and/or language characterizations may be utilized by the system to perform one or more searches and/or queries of one or more databases for information and/or items that are relevant to the key elements and/or language characterizations. The one or more databases may include databases and/or resources that are associated with an intranet of the entity, such as databases and/or resources that are not publicly available but are instead available to devices authorized to access the intranet, the internal databases, and/or the internal resources. These internal databases may include information such as emails, voicemails, internal network drives, internal communication platforms, catalogs of versions of websites associated with the entity, etc. Additionally, the one or more databases may include external databases and/or external resources that are publicly-available to the entity. These external databases may include resources available using web browsing techniques, digital-property databases, intellectual property databases, etc.

The systems described herein may search the one or more databases and may return search results that are relevant to the key elements and/or language characterizations. The search results may be ranked such that the most relevant results are ranked more favorably than less relevant results. The results, as ranked, may be caused to be displayed on one or more devices associated with the entity. In examples, a link or resource locator may be displayed for some or all of the documents associated with the search results. In other examples, the documents themselves and/or portions of the documents may be displayed for some or all of the documents. A relevancy score may be determined for some or all of the search results, and the relevancy score may be utilized to determine which search results are most relevant and therefore will be displayed, and which search results are less relevant and therefore will not be displayed (or will be displayed secondarily). For example, a threshold relevancy score may be set and only search results with relevancy scores meeting or exceeding that threshold relevancy score may be displayed. In other examples, a number of search results may be set and only that number of the most relevant search results may be displayed. For example, a limit of 20 results may be set and only the 20 search results with the highest relevancy scores may be displayed.

The user interfaces may, in addition to displaying the search results, display one or more options to provide input associated with the search results. The options may include indicating that a given search result does or does not correspond to the digital property in question. For example, a user may view a given search result to determine whether the search result matches or corresponds to the digital property. In examples where the search result does not correspond to the digital property, the user may provide input indicating as much. In examples where the search result does correspond to the digital property, the user may provide input indicating as much. The user interface may also display information indicating which search results have been reviewed and/or which search results have been marked or otherwise indicated to differ from or correspond to the digital property. This may provide the user of the system with an indication of which search results still need to be reviewed and/or which search results are potentially problematic.

In examples where none of the search results correspond to the digital property, an indication of this determination may be stored with respect to the entity's system, and/or the indication may be sent to a trade secret registry system associated with a trade-secret registry, and/or the indication may be sent to an insurer system associated with an insurer of the digital property, if any. This information may be utilized by the entity and/or the trade secret registry system to determine whether to register the digital property with the trade-secret registry. This information may additionally, or alternatively, be utilized by the entity and/or the insurer system to determine whether to seek and/or provide insurance coverage for the digital property, and/or to set policy limits and/or conditions and/or parameters for coverage of the digital property.

Additionally, or alternatively, audits associated with the digital property may be scheduled utilizing the key elements and/or language characterizations described herein. For example, in addition to or instead of performing the digital-property analysis described above at the time that a digital property is to be registered with a trade-secret registry or otherwise identified as a trade secret and/or valuable item, the digital-property analysis may be performed on a scheduled basis, such as periodically, as a means to audit whether the digital property was disclosed in a manner that would render the digital property less valuable and/or terminate its status as, for example, a trade secret. The system and/or users of the system may identify and/or determine an auditing schedule for performing searches utilizing the key elements and/or language characterizations as search terms. The auditing schedule may be based on periodic auditing, such as every 30 days, every 2 weeks, every quarter, etc., and/or the auditing schedule may be based on given dates and/or the occurrence of given events determined by the system and/or by users of the system. The searches described above may be performed based at least in part on the auditing schedule and search results may be returned for each such search. An individual tasked with reviewing the search results, herein described as an auditor, may receive a notification, such as a notification sent to a device associated with the auditor, indicating that search results are pending review. The auditor may view some or all of the search results and indicate whether the search results correspond to the digital property, as described more fully herein.

The outcome of a given scheduled search may be that none of the results correspond to the digital property. However, in other examples, the outcome of a given scheduled search may be that at least one of the results corresponds to the digital property. In these examples, information about the source of the search result in question may be displayed via the user interface, which may assist the auditor in determining whether the disclosure of the digital property amounts to an unintentional but lawful disclosure or a potential misappropriation of the digital property. The user interface may provide functionality to allow the user to indicate which of the situations is relevant for a given disclosure. In examples where the disclosure was unintentional but lawful, the user interface may display functionality that allows the auditor to select options for actions to be taken. Those options may include deregistering the digital property with the trade-secret registry, marking the digital property as disclosed, altering one or more parameters (such as value) of the digital property, notifying an insurer system of the disclosure, and/or canceling an insurance policy associated with the digital property, for example. In examples where the disclosure amounts to a potential misappropriation of the digital property, the user interface may display functionality that allows the auditor to select options for actions to the taken. Those options may include opening one or more wizards to provide information for making an insurance claim, notifying the insurer system of the potential misappropriation, and/or retrieving and/or generating information associated with the discovery of the potential misappropriation to be stored and utilized if needed, such as during litigation.

Additionally, or alternatively, the systems for automated digital-property analysis may be utilized to generate an information catalog associated with digital-property analyses. For example, when an analysis is performed as described above, a copy and/or instance of the internal resources and/or databases may be generated. A timestamp associated with when the instance was generated may be generated and may be associated with the instance. Some or all instances of the internal resources and/or databases may be stored in a database, also described herein as a catalog. The catalog of information may be utilized as a database to be searched for subsequent digital-property analyses, whether with respect to the same digital property and/or same key elements and/or language characterizations and/or with respect to different digital property and/or different key elements and/or language characterizations.

Additionally, or alternatively, the systems for automated digital-property analysis may be utilized to register some or all data associated with a given analysis with a distributed-ledger system, such as a blockchain. For example, an obfuscation value, which may be a hash value, may be generated that corresponds to the digital property, the key elements and/or language characterizations, identifiers of the analyzed databases, the search results, the ranking of search results, and/or the indications provided by the auditor in association with review of the search results. The obfuscation value may correspond to a unique identifier of a given analysis. The obfuscation value may be sent to a distributed-ledger system associated with a distributed ledger. The distributed-ledger system may register the obfuscation value with a block of the blockchain and may generate a block value corresponding to the block of the blockchain at which the obfuscation value is registered. The distributed-ledger system may send the block value back to the systems for automated digital-property analysis and/or the trade secret registry system along with, in some examples, a timestamp associated with registration of the obfuscation value with the distributed ledger. The block value may be utilized to provide a verifiable indication of when a given digital-property analysis was performed and the attributes of the analysis.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for automated digital-property analysis. The architecture 100 may include, for example, one or more client-side devices, also described herein as electronic devices 102, that allow clients to register and manage digital properties. The architecture 100 also includes a trade secret registry system 104 associated with a trade-secret registry that is remote from, but in communication with, the client-side electronic devices 102. The architecture 100 further includes a distributed-ledger system 106 that is remote from, but in communication with, the client-side devices 102 and the trade secret registry 104. The distributed-ledger system 106 may utilize blockchain technology to accept entries in a secure, verifiable manner, such as obfuscation values associated with the digital properties being registered by the trade-secret registry. The architecture 100 also includes an insurer system 108, which may be associated with an insurer. The insurer system 108 may utilize information from the registry system 104 and/or the distributed-ledger system 106 to, for example, issue insurance policies associated with the digital properties being registered by the trade-secret registry. Some or all of the devices and systems may be configured to communicate with each other via a network 110. The architecture 100 may also include one or more external databases 154, which may correspond to publicly-available information that may be accessed via the network 110 by the electronic devices 102.

The electronic devices 102 may include components such as, for example, one or more processors 122, one or more network interfaces 124, memory 126, one or more displays 128, and/or one or more input elements 130. The memory 126 may include components such as, for example, a language characterizer 132, an author-identification component 134, one or more internal databases 136, a query component 138, one or more user interfaces 140, a communications component 142, an obfuscation component 144, a scheduling component 146, an information catalog 148, an access database 150, and/or one or more wizards 152. As shown in FIG. 1, the electronic devices 102 may include, for example, a computing device, a mobile phone, a tablet, a laptop, and/or one or more servers. The components of the electronic device 102 will be described below by way of example. It should be understood that the examples provided herein are illustrative and should not be considered the exclusive examples of the components of the electronic device 102.

It should be understood that the electronic device 102 may represent and/or correspond to devices and/or systems and/or functionality that is associated with an entity, and operations described as being performed by and/or utilizing the electronic device 102 may be performed on and/or by a trusted network and/or trusted domain, such as utilizing one or more firewalls. By so doing, the secrecy of the document in question may be maintained while operations are being performed in conjunction with the document.

The trade secret registry system 104 may include components such as one or more processors 112, one or more network interfaces 114, and/or memory 116. The memory 116 may include one or more components such as a trade-secret registry 118 and/or a communications component 120. The components of the trade secret registry system 104 will be described below by way of example. It should be understood that the examples provided herein are illustrative and should not be considered the exclusive examples of the components of the trade secret registry system 104.

For example, the language characterizer 132 of the electronic devices 102 may be configured to receive a document representing a digital property and identify, determine, and/or generate one or more keywords and/or other elements representing the subject matter of the document. For example, the language characterizer 132 may determine key elements and/or language characterizations such as key words and/or language characterizations and/or phrases associated with the subject matter of the document. The electronic devices 102 may display these key elements and/or language characterizations, such as via the user interfaces 140, for a user of the electronic devices 102 to review and/or change and/or confirm. In some examples, a user may utilize the user interfaces 140 to exclude words and/or representations from a given query. In other examples, the electronic devices 102 may provide functionality that allows a user of the electronic devices 102 to provide input corresponding to the key elements and/or language characterizations such that the user identifies the key elements and/or language characterizations.

In examples, the language characterizer 132 may be utilized to generate key elements and/or language characterizations utilizing information other than a given document. For example, information associated with a given entity's competitive advantage and/or market may be provided by the entity. In these examples, the entity may provide a characterization of the market(s) associated with the entity as well as characterizations may the documents relevancy and/or applicability to the market(s). Additional information provided by the entity may include, for example, a broad indication of market, an indication of a product line and/or product-specific market, and/or additional categorizations of sub-markets and/or product classifications. Additional information may also include valuation of a given market, a competitive advantage of the entity's intellectual property, a margin and/or market share enabled by the competitive advantage, and/or competitor-related information. All or some of this information may be utilized to establish a narrative and/or the entity may provide a narrative of the document in question. The narrative and/or the information described above may be utilized to generate key elements and/or language characterizations for use in generating queries and performing searches as described herein. By so doing, in some examples the document in question may be utilized to generate key elements and/or language characterizations, but in other examples the document may not be utilized and instead the information associated with the document described above may be utilized to generate the key elements and/or the language characterizations. In these examples, generation of the key elements and/or language characterizations may be performed by the broker system 104 while maintaining secrecy of the document itself. Thereafter, search results may be return as described elsewhere herein and the document itself may be compared to the search results to provide an indication of a degree of similarity as between the document and the results. In this way, an external search may be performed without use of the document itself, which may reduce risk of disclosure of the document during an external search, and then a more robust and/or comprehensive analysis of the results in association with the document itself may be performed internally.

The author-identification component 134 of the electronic devices 102 may be configured to receive the document representing the digital property and identify, determine, and/or generate one or more author identifiers, such as identifiers of authors and/or creators of the document and/or subject matter associated with the document. The identifiers may include names and/or other identifying information associated with the authors and/or creators. The electronic device 102 may display these key elements and/or language characterizations and/or language characterizations, such as via the user interfaces 140, for a user of the electronic devices 102 to review and/or change and/or confirm. In other examples, the electronic devices 102 may provide functionality that allows a user of the electronic devices 102 to provide input corresponding to the key elements and/or language characterizations such that the user identifies the key elements and/or language characterizations and/or language characterizations. In examples, the language characterizer 132 and the author-identification component 134 may be the same component.

The key elements and/or language characterizations and/or language characterizations may be utilized by the electronic devices 102 to perform one or more searches and/or queries of the one or more internal databases 136 and/or the one or more external databases 154 for documents that are relevant to the key elements and/or language characterizations. The one or more internal databases 136 may include databases and/or resources that are associated with an intranet of the entity, such as databases and/or resources that are not publicly available but are instead available to devices with the authorization to access the intranet, the internal databases 136 and/or the internal resources. These internal databases 136 may include information such as emails, voicemails, internal network drives, internal communication platforms, catalogs of versions of websites associated with the entity, etc. Additionally, the electronic devices 102 may be configured to access and search, such as via the network 110, the one or more external databases 154, which may include external databases and/or external resources that are publicly-available to the entity. These external databases 154 may include resources available using web browsing techniques, digital-property databases, intellectual property databases, partner web sites, etc.

The query component 138 may be configured to receive the key elements and/or language characterizations from the language characterizer 132 and/or the author-identification component 134 and to perform searches of the one or more internal databases 136 and/or external databases 154, and may return search results that are relevant to a given query. The query component 138 may utilize keyword searching techniques, such as searching for a specific word and/or phrase corresponding to a key element, excluding and/or including additional terms associated with key elements and/or language characterizations, searching related links and/or items indicated as relevant, searching for omitted words associated with key elements and/or language characterizations, searching by specific file type, searching by image comparison, etc. It should be understood that instead of generating key elements and/or language characterizations as described above and utilizing the key elements and/or language characterizations to perform the searches, the query component 138 may utilize the document itself as the search query. In examples, a query may be generated utilizing narrative information associated with the digital property and results may be returned. Thereafter, a query may be generated utilizing the language characterization of the digital property and may be utilized to search the results.

The query component 138 may also be configured to rank search results such that the most relevant results are ranked more favorably than less relevant results. Ranking of search results may be performed using one or more ranking techniques and/or factors, such as the prevalence of a key element and/or language characterization in a given result, the number of key elements and/or language characterizations in a given result, a similar syntax and/or diction associated with the key elements and/or language characterizations, an amount of time from when the search is performed and when the result was generated and/or modified. Some specific techniques to perform the searching and/or ranking functionality may include term-frequency inverse-document-frequency techniques, word vectoring approaches, named-entity recognition, computer vision techniques, and/or ensembles thereof, for example.

The results, as ranked, may be caused to be displayed on the one or more displays 128 via the user interfaces 140. In examples, a link or resource locator may be displayed for some or all of the items associated with the search results. In other examples, the results themselves and/or portions of the results may be displayed for some or all of the results. A relevancy score may be determined for some or all of the search results, and the relevancy score may be utilized to determine which search results are most relevant and therefore will be displayed, and which search results are less relevant and therefore will not be displayed (or will be displayed secondarily). For example, a threshold relevancy score, such as 85%, may be set and only search results with relevancy scores meeting or exceeding that threshold relevancy score may be displayed. In other examples, a number of search results may be set and only that number of the most relevant search results may be displayed. For example, a limit of 20 results may be set and only the 20 search results with the highest relevancy scores may be displayed.

The user interfaces 140 may, in addition to displaying the search results, display one or more options to provide input associated with the search results. The options may include indicating that a given search result does or does not correspond to the digital property in question. For example, a user may view a given search result to determine whether the search result matches or corresponds to the digital property. In examples where the search result does not correspond to the digital property, the user may provide input indicating as much. The input may be received via the one or more input elements 130. In examples where the search result does correspond to the digital property, the user may provide input indicating as much. The user interface 140 may also display information indicating which search results have been reviewed and/or which search results have been marked or otherwise indicated to differ from or correspond to the digital property. This may provide the user of the electronic device 102 with an indication of which search results still need to be reviewed and/or which search results are potentially problematic.

In examples where none of the search results correspond to the digital property, an indication of this determination may be stored with respect to the electronic device 102. Additionally, the communications component 142 may be configured to send the indication to the trade secret registry system 104, and/or the indication may be sent to the insurer system 108 associated with an insurer of the digital property, if any. This information may be utilized by the entity and/or the trade secret registry system 104 to determine whether to register the digital property with the trade-secret registry 118. This information may additionally, or alternatively, be utilized by the entity and/or the insurer system 108 to determine whether to seek and/or provide insurance coverage for the digital property, and/or to set policy limits and/or conditions and/or parameters for coverage of the digital property. The communications component 142 may be configured to enable communications between the electronic device 102 and the other components of the architecture 100, such as the registry system 104, the distributed-ledger system 106, and/or the insurer system 108. The communications component 142 may further generate data to be communicated and/or may format already-generated data for transfer to one or more of the remote systems. The communications component 142 may also be configured to receive data from one or more of the remote systems.

The digital-property analysis described herein may also be used to determine if a to-be registered digital property has already been registered and/or if a version of the digital property has already been registered. A user of the system may utilize this information to either confirm that the digital property should be registered and/or to cease registration and/or to indicate that the digital property is a version of an already-registered version of the digital property.

The scheduling component 146 may be configured to identify, determine, and/or generate auditing schedules for performing searches associated with the digital property. For example, audits associated with the digital property may be scheduled utilizing the key elements and/or language characterizations described herein. For example, in addition to or instead of performing the digital-property analysis described above at the time that a digital property is to be registered with the trade-secret registry 118 or otherwise identified as a trade secret and/or valuable item, the digital-property analysis may be performed on a scheduled basis, such as periodically, as a means to audit whether the digital property was disclosed in a manner that would render the digital property less valuable and/or terminate its status as, for example, a trade secret. The scheduling component 146 and/or users of the electronic device 102 may identify and/or determine an auditing schedule for performing searches utilizing the key elements and/or language characterizations as search terms. The auditing schedule may be based on periodic auditing, such as every 30 days, every 2 weeks, every quarter, etc., and/or the auditing schedule may be based on given dates and/or the occurrence of given events determined by the electronic device 102 and/or by users of the electronic device 102. The searches described above may be performed based at least in part on the auditing schedule and search results may be returned for each such search. An individual tasked with reviewing the search results, herein described as an auditor, may receive a notification, such as a notification sent to a device associated with the auditor, indicating that search results are pending review. The auditor may view some or all of the search results and indicate whether the search results correspond to the digital property, as described more fully herein.

The outcome of a given scheduled search may be that none of the results correspond to the digital property. However, in other examples, the outcome of a given scheduled search may be that at least one of the results corresponds to the digital property. In these examples, information about the source of the search result in question may be displayed via the user interface 140, which may assist the auditor in determining whether the disclosure of the digital property amounts to an unintentional but lawful disclosure or a potential misappropriation of the digital property. The user interface 140 may provide functionality to allow the user to indicate which of the situations is relevant for a given disclosure. In examples where the disclosure was unintentional but lawful, the user interface 140 may display functionality that allows the auditor to select options for actions to be taken.

For example, the one or more wizards 152 may be enabled and may present the options of deregistering the digital property with the trade-secret registry 118, marking the digital property as disclosed, altering one or more parameters (such as value) of the digital property, notifying the insurer system 108 of the disclosure, and/or canceling an insurance policy associated with the digital property, for example. In examples where the disclosure amounts to a potential misappropriation of the digital property, the user interface 140 may display functionality that allows the auditor to select options for actions to the taken. The one or more wizards 152 may be enabled and may present the options of providing information for making an insurance claim, notifying the insurer system 108 of the potential misappropriation, and/or retrieving and/or generating information associated with the discovery of the potential misappropriation to be stored and utilized if needed, such as during litigation. The wizards 152 as described herein may be a set of dialog boxes and/or input fields configured to be displayed, such as via the electronic device 102. For example, a wizard 152 may be utilized to receive user input for insurance policy application, underwriting, and provision. In examples where a wizard 152 is utilized for insurance policy provision, the wizard 152 and/or information associated with the wizard 152 may be provided by and/or may be specific to a given insurer. Additionally, or alternatively, a wizard 152 may be utilized to submit a notice of a potential misappropriation event and/or an insurance claim, as described more fully herein.

Additionally, or alternatively, the electronic devices 102 may be utilized to generate the information catalog 148 associated with digital-property analyses. For example, when an analysis is performed as described above, a copy and/or instance of the internal resources and/or databases may be generated. A timestamp associated with when the instance was generated may be generated and may be associated with the instance. Some or all instances of the internal resources and/or databases may be stored in a database, also described herein as the information catalog 148. The information catalog 148 may be utilized as a database 136 to be searched for subsequent digital-property analyses, whether with respect to the same digital property and/or same key elements and/or language characterizations and/or with respect to different digital property and/or different key elements and/or language characterizations.

The access database 150 may be configured to identify and/or determine user identifiers associated with users interacting with the electronic devices 102. For example, when users provide input associated with the key elements and/or language characterizations, the queries, viewing of search results, and/or providing indications of similarity between search results and digital property, those interactions may be recorded and may be associated with user identifiers for the users providing those inputs. This information may be stored in association with the access database 150, which may be utilized to identify users that have had access to the digital property and/or search results, and/or which users made decisions associated with review of search results.

Additionally, or alternatively, the electronic devices 102 may be utilized to register some or all data associated with a given analysis with the distributed-ledger system 106, such as a blockchain. For example, the obfuscation component 144 may be configured to generate an obfuscation value, which may be a hash value, that corresponds to the digital property, the key elements and/or language characterizations, identifiers of the analyzed databases, the search results, the ranking of search results, and/or the indications provided by the auditor in association with review of the search results. The obfuscation value may correspond to a unique identifier of a given analysis. The obfuscation component 144 may receive data corresponding to the document, such as from one or more databases and/or other storage locations associated with the electronic device 102 and/or remote storage accessible by the electronic device 102. The obfuscation component 144 may also be described herein as a hash function and may be configured to map data of an arbitrary size to data of a fixed size. The obfuscation values may also be described herein as hash codes, digests, and/or hashes. The hash functions may utilize one or more algorithms to generate obfuscation values. The algorithms may include, for example, trivial hash functions, perfect hashing, minimal perfect hashing, hashing uniformly distributed data, hashing data with other distributions, hashing variable-length data, special-purpose hash functions, rolling hashes, universal hashing, hashing with checksum functions, multiplicative hashing, hashing by nonlinear table lookup, efficient hashing of strings, and/or one or more other hashing algorithms. In general, the obfuscation component 144 may receive, as input, text data, image data, formatting data, and/or other data corresponding to the analyses, and may generate, as output, an obfuscation value that corresponds to the input. In examples, the electronic device 102 may include multiple obfuscation components that each employ a different hashing algorithm. In these examples, each obfuscation component may output a different document obfuscation value for the same document.

The obfuscation value may be sent, such as via the network 110, to the distributed-ledger system 106 associated with a distributed ledger. The distributed-ledger system 106 may register the obfuscation value with a block of the blockchain and may generate a block value corresponding to the block of the blockchain at which the obfuscation value is registered. The distributed-ledger system 106 may send the block value back to the electronic device 102 and/or the trade secret registry system 104 along with, in some examples, a timestamp associated with registration of the obfuscation value with the distributed ledger. The block value may be utilized to provide a verifiable indication of when a given digital-property analysis was performed and the attributes of the analysis.

As used herein, a blockchain is a list and/or ledger of records, also described as blocks, that are linked using cryptography. A block in the blockchain contains a cryptographic hash of the previous block, a time value or timestamp, and, in examples, transaction data. The blockchain may be utilized to record transactions between two entities and/or systems. In these examples, the blockchain may be utilized to record the transaction of registering a trade secret in a trade-secret registry 118 between the electronic device 102 and the registry system 104. As described in more detail elsewhere herein, the blockchain may also be utilized to register insurance policy documents and/or digital-property analyses. The blockchain may be managed by a peer-to-peer network collectively adhering to a protocol for inter-node communication and validating new blocks. Once recorded in a block, the data cannot be altered without alteration of all subsequent blocks, which would require a majority of the network to agree upon.

In examples, multiple blockchain systems may be utilized. For example, the obfuscation value may be sent to multiple blockchain systems, and each blockchain system may return a block value corresponding to a block in their respective blockchains. Such redundancy may remove dependency on the operation of any particular distributed-ledger system, which may, at some point encounter problems in maintaining a particular ledger, such as computing errors, cyberattacks, server failures, and/or stoppage of business. As described more fully below, the record indicating registration of the digital property with the trade-secret registry 118 may include the multiple block values and/or other information associated with registration of blocks in the multiple blockchains.

With respect to the registry system 104, the communications component 120 may be configured to enable communications between the registry system 104 and the other components of the architecture 100, such as the electronic device 102, the distributed-ledger system 106, and/or the insurer system 108. The communications component 120 may further generate data to be communicated and/or may format already-generated data for transfer to other components of the architecture 100. The communications component 120 may also be configured to receive data from one or more of the other remote systems and/or the electronic device 102.

The trade-secret registry 118 may be configured to store and/or maintain and/or register records associated with the registration of digital property with the trade-secret registry 118. For example, a record generator of the registry system 104 may generate a record in the trade-secret registry 118. For example, the record may include an identifier of the record, a naming indicator for the digital property, a description of the digital property, a naming indicator of the document, one or more tags, a status identifier for the record, the obfuscation value (if any), the block value (if any), the block number (if any), the time value (also described as the block timestamp), insurance policy details (if any), valuation details, and/or other information associated with the digital property. The record may be stored along with one or more other records in the trade-secret registry 118. In examples, the trade-secret registry 118 may be searchable. For example, an interface may be generated and configured to allow access to at least a portion of the trade-secret registry 118 via the electronic device 102 and/or a remote docketing system associated with other intellectual property assets. When scheduled audits and/or other digital-property analyses as described herein are performed, the trade-secret registry 118 may be a database queried for search results.

As shown in FIG. 1, several of the components of the registry system 104, the distributed-ledger system 106, and/or the insurer system 108 and the associated functionality of those components as described herein may be performed by one or more of the other systems and/or by the electronic device 102. Additionally, or alternatively, some or all of the components and/or functionalities associated with the electronic device 102 may be performed by the registry system 104, the distributed-ledger system 106, and/or the insurer system 108.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

It should be understood that anywhere in this disclosure where the term "trade secret" is used, it should be noted to include not only trade secrets, but any document and/or data and/or information including confidential information, know-how, and other information, and not necessarily documents, data, and/or information meeting a legal definition of the term "trade secret."

As used herein, a processor, such as processor(s) 112 and/or 122, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112 and/or 122 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 and/or 122 may possess its own local memory, which also may store program components, program data, and/or one or more operating systems.

The memory 116 and/or 126 may include volatile and nonvolatile memory, removable and non-removable media implemented in any method or technology for storage of information, such as computer-readable instructions, data structures, program component, or other data. Such memory 116 and/or 126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116 and/or 126 may be implemented as computer-readable storage media ("CRSM"), which may be any available physical media accessible by the processor(s) 112 and/or 122 to execute instructions stored on the memory 116 and/or 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116 and/or 126, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 114 and/or 124 may enable messages between the components and/or devices shown in architecture 100 and/or with one or more other remote systems, as well as other networked devices. Such network interface(s) 114 and/or 124 may include one or more network interface controllers (NICs) or other types of transceiver devices to send and receive messages over the network 110.

For instance, each of the network interface(s) 114 and/or 124 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114 and/or 124 may include a wide area network (WAN) component to enable message over a wide area network.

In some instances, the registry system 104 may be local to an environment associated the electronic device 102. For instance, the registry system 104 may be located within the electronic device 102. In some instances, some or all of the functionality of the registry system 104 may be performed by the electronic device 102. Also, while various components of the registry system 104 have been labeled and named in this disclosure and each component has been described as being configured to cause the processor(s) to perform certain operations, it should be understood that the described operations may be performed by some or all of the components and/or other components not specifically illustrated.

Figure 2:
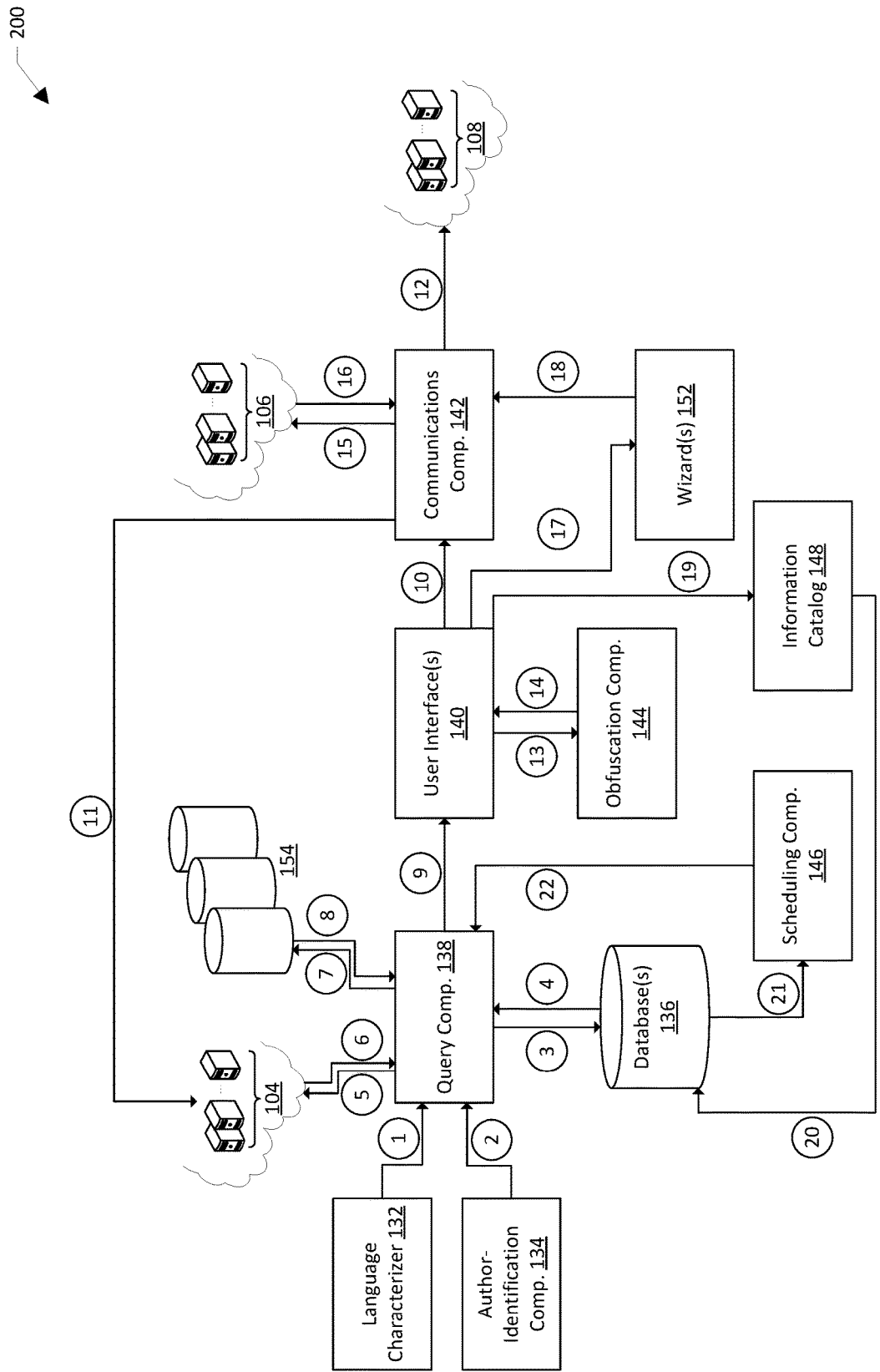
FIG. 2 illustrates an example architecture of example components of systems for automated digital-property analysis.

FIG. 2 illustrates an example architecture 200 of example components for automated digital-property analysis. The system 200 may include some or all of the components as described with respect to FIG. 1. For example, the system 200 may include a language characterizer 132, an author-identification component 134, one or more internal databases 136, a query component 138, one or more user interfaces 140, a communication component 142, an obfuscation component 144, a scheduling component 146, an information catalog 148, one or more wizards 152, one or more external databases 154, a trade secret registry system 104, a distributed-ledger system 106, and/or an insurer system 108. The components are shown and described using steps 1-22, as illustrated in FIG. 2. It should be understood that while steps 1-22 are described in sequential order, some or all of the operations may be performed in an order other than that described herein and/or some or all of the operations may be performed in parallel.

At step 1, the language characterizer 132 may receive a document representing a digital property and may utilize the document to generate one or more key words and/or language characterizations, also described herein as key elements and/or language characterizations associated with the document. For example, the language characterizer 132 may determine key elements and/or language characterizations such as key words and/or language characterizations and/or phrases associated with the subject matter of the document. Electronic devices associated with users of the system 200 may display these key elements and/or language characterizations, such as via user interfaces 140, for a user of the electronic devices to review and/or change and/or confirm. In other examples, the electronic devices may provide functionality that allows a user of the electronic devices to provide input corresponding to the key elements and/or language characterizations such that the user identifies the key elements and/or language characterizations. The language characterizer 132 may provide the key elements and/or language characterizations to the query component 138.

At step 2, the author-identification component 134 may receive the document and may utilize the document to generate identification data that identifies one or more authors of the document. For example, the author-identification component 134 may generate one or more author identifiers, such as identifiers of authors and/or creators of the document and/or subject matter associated with the document. The identifiers may include names and/or other identifying information associated with the authors and/or creators. The electronic device may display these key elements and/or language characterizations, such as via the user interfaces 140, for a user of the electronic devices to review and/or change and/or confirm. In other examples, the electronic devices may provide functionality that allows a user of the electronic devices to provide input corresponding to the key elements and/or language characterizations such that the user identifiers the key elements and/or language characterizations. The author-identification component 134 may provide the key elements and/or language characterizations to the query component 138.

At step 3, the query component 138 may perform a search and/or query of one or more internal databases 136 associated with the electronic device and/or system from which the document was provided. The query component 138 may be configured to receive the key elements and/or language characterizations from the language characterizer 132 and/or the author-identification component 134 and to perform searches of the one or more internal databases 136, and may return, at step 4, search results that are relevant to a given query. The query component 138 may utilize keyword searching techniques, such as searching for a specific word and/or phrase corresponding to a key element, excluding and/or including additional terms associated with key elements and/or language characterizations, searching related links and/or items indicated as relevant, searching for omitted words associated with key elements and/or language characterizations, searching by specific file type, searching by image comparison, etc. In examples, a standalone web browser application and/or a plug in to a commercially available browser application may be utilized. It should be understood that instead of generating key elements and/or language characterizations as described above and utilizing the key elements and/or language characterizations to perform the searches, the query component 138 may utilize the document itself as the search query.

The query component 138 may also be configured to rank search results such that the most relevant results are ranked more favorably than less relevant results. Ranking of search results may be performed using one or more ranking techniques and/or factors, such as the prevalence of a key element and/or language characterization in a given result, the number of key elements and/or language characterizations in a given result, a similar syntax and/or diction associated with the key elements and/or language characterizations, an amount of time from when the search is performed and when the result was generated and/or modified. Some specific techniques to perform the searching and/or ranking functionality may include term-frequency inverse-document-frequency techniques, word vectoring approaches, named-entity recognition, computer vision techniques, and/or ensembles thereof, for example.

At step 5, the query component 138, in addition to or instead of searching for relevant information from the one or more internal databases 136, may query and/or search information stored in association with a trade secret registry system 104. For example, the trade secret registry system 104 may be associated with a trade-secret registry that includes records associated with digital property that has been registered with the trade-secret registry. The records may be searched by the query component 138 for relevant information. In examples, only records associated with the electronic device and/or entity associated with the document in question may be searched. At step 6, the query component 138 may receive search results from the trade secret registry system 104 and those results may be some or all of the search results for a given query. Those search results may be ranked in the same or a similar manner as described above with respect to results from the one or more internal databases 136.

At step 7, the query component 138, in addition to or instead of searching for relevant information from the one or more internal databases 136 and/or the trade secret registry system 104, may query and/or search information stored in association with one or more external databases 154. For example, the external databases 154 may include external resources that are publicly-available to the entity. These external databases 154 may include resources available using web browsing techniques, digital-property databases, intellectual property databases, etc. At step 8, the query component 138 may receive search results from the external databases 154 and those results may be ranked in the same or a similar manner as described above with respect to results from the internal databases 136 and/or the trade secret registry system 104.

At step 9, the search results, as ranked, may be caused to be displayed, such as via one or more user interfaces 140. In examples, a link or resource locator may be displayed for some or all of the items associated with the search results. In other examples, the items themselves and/or portions of the items may be displayed for some or all of the items. A relevancy score may be determined for some or all of the search results, and the relevancy score may be utilized to determine which search results are most relevant and therefore will be displayed, and which search results are less relevant and therefore will not be displayed (or will be displayed secondarily). For example, a threshold relevancy score, such as 85%, may be set and only search results with relevancy scores meeting or exceeding that threshold relevancy score may be displayed. In other examples, a number of search results may be set and only that number of the most relevant search results may be displayed. For example, a limit of 20 results may be set and only the 20 search results with the highest relevancy scores may be displayed.

The user interfaces 140 may, in addition to displaying the search results, display one or more options to provide input associated with the search results. The options may include indicating that a given search result does or does not correspond to the digital property in question. For example, a user may view a given search result to determine whether the search result matches or corresponds to the digital property. In examples where the search result does not correspond to the digital property, the user may provide input indicating as much. In examples where the search result does correspond to the digital property, the user may provide input indicating as much. The user interface 140 may also display information indicating which search results have been reviewed and/or which search results have been marked or otherwise indicated to differ from or correspond to the digital property. This may provide the user of the electronic device with an indication of which search results still need to be reviewed and/or which search results are potentially problematic. In examples where none of the search results correspond to the digital property, an indication of this determination may be stored with respect to the electronic device. At step 10, the information indicating which search results have been reviewed and/or which search results have been marked or otherwise indicated to differ from or correspond to the digital property may be provided to the communications component 142.

At step 11, the communications component 142 may be configured to send the indication to the trade secret registry system 104. This information may be utilized by the entity and/or the trade secret registry system 104 to determine whether to register the digital property with the trade-secret registry.

At step 12, the indication may be sent to the insurer system 108 associated with an insurer of the digital property, if any. This information may additionally, or alternatively, be utilized by the entity and/or the insurer system 108 to determine whether to seek and/or provide insurance coverage for the digital property, and/or to set policy limits and/or conditions and/or parameters for coverage of the digital property. The communications component 142 may be configured to enable communications between the electronic device and the other components of the system 200, such as the registry system 104, the distributed-ledger system 106, and/or the insurer system 108. The communications component 142 may further generate data to be communicated and/or may format already-generated data for transfer to one or more of the remote systems. The communications component 142 may also be configured to receive data from one or more of the remote systems.

Additionally, the electronic devices may be utilized to register some or all data associated with a given analysis with the distributed-ledger system 106, such as a blockchain. For example, at step 13, the obfuscation component 144 may be configured to receive data from the user interfaces 140 and/or other components of the system 200 and generate an obfuscation value, which may be a hash value, that corresponds to the digital property, the key elements and/or language characterizations, identifiers of the analyzed databases, the search results, the ranking of search results, and/or the indications provided by the auditor in association with review of the search results. The obfuscation value may correspond to a unique identifier of a given analysis. At step 14, the obfuscation component 144 may be configured to send the obfuscation value to one or more other components of the system 200, such as the user interfaces 140 and/or the communication component 142. The obfuscation component 144 may receive data corresponding to the document, such as from one or more databases and/or other storage locations associated with the electronic device 102 and/or remote storage accessible by the electronic device 102. The obfuscation component 144 may also be described herein as a hash function and may be configured to map data of an arbitrary size to data of a fixed size. In general, the obfuscation component 144 may receive, as input, text data, image data, formatting data, and/or other data corresponding to the analyses, and may generate, as output, an obfuscation value that corresponds to the input. In examples, the electronic device may include multiple obfuscation components that each employ a different hashing algorithm. In these examples, each obfuscation component may output a different document obfuscation value for the same document.

At step 15, the obfuscation value may be sent to the distributed-ledger system 106 associated with a distributed ledger. The distributed-ledger system 106 may register the obfuscation value with a block of the blockchain and may generate a block value corresponding to the block of the blockchain at which the obfuscation value is registered. The distributed-ledger system 106 may send, at step 16, the block value back to the electronic device and/or the trade secret registry system 104 along with, in some examples, a timestamp associated with registration of the obfuscation value with the distributed ledger. The block value may be utilized to provide a verifiable indication of when a given digital-property analysis was performed and the attributes of the analysis.

Additionally, in examples where a user determines that at least one of the search results matches or otherwise corresponds to the document in question, the user may provide an indication of the correspondence, which may cause, at step 17, one or more wizards 152 to be displayed via the user interfaces 140. For example, the one or more wizards 152 may be enabled and may present the options of deregistering the digital property with the trade-secret registry, marking the digital property as disclosed, altering one or more parameters (such as value) of the digital property, notifying the insurer system 108 of the disclosure, and/or canceling an insurance policy associated with the digital property, for example. In examples where the disclosure amounts to a potential misappropriation of the digital property, the user interface 140 may display functionality that allows the user to select options for actions to the taken. The one or more wizards 152 may be enabled and may present the options of providing information for making an insurance claim, notifying the insurer system 108 of the potential misappropriation, and/or retrieving and/or generating information associated with the discovery of the potential misappropriation to be stored and utilized if needed, such as during litigation. The wizards 152 as described herein may be a set of dialog boxes and/or input fields configured to be displayed, such as via the electronic device. For example, a wizard 152 may be utilized to receive user input for insurance policy application, underwriting, and provision. In examples where a wizard 152 is utilized for insurance policy provision, the wizard 152 and/or information associated with the wizard 152 may be provided by and/or may be specific to a given insurer. Additionally, or alternatively, a wizard 152 may be utilized to submit a notice of a potential misappropriation event and/or an insurance claim, as described more fully herein. At step 18, the communication component 142 may receive input data representing input to the one or more fields associated with the wizards 152, and that information may be sent along to one or more other components of the system 200, such as the insurer system 108.

Additionally, in examples, the electronic devices may be utilized to generate the information catalog 148 associated with digital-property analyses. For example, at step 19, when an analysis is performed as described above, a copy and/or instance of the internal resources and/or databases 136 may be generated. A timestamp associated with when the instance was generated may be generated and may be associated with the instance. At step 20, some or all instances of the internal resources and/or databases 136 may be stored in a database, also described herein as the information catalog 148. The information catalog 148 may be utilized as a database 136 to be searched for subsequent digital-property analyses, whether with respect to the same digital property and/or same key elements and/or language characterizations and/or with respect to different digital property and/or different key elements and/or language characterizations.

At step 21, scheduling component 146 may be configured to identify, determine, and/or generate auditing schedules for performing searches associated with the digital property. For example, audits associated with the digital property may be scheduled utilizing the key elements and/or language characterizations described herein. For example, in addition to or instead of performing the digital-property analysis described above at the time that a digital property is to be registered with the trade-secret registry or otherwise identified as a trade secret and/or valuable item, the digital-property analysis may be performed on a scheduled basis, such as periodically, as a means to audit whether the digital property was disclosed in a manner that would render the digital property less valuable and/or terminate its status as, for example, a trade secret. The scheduling component 146 and/or users of the electronic device may identify and/or determine an auditing schedule for performing searches utilizing the key elements and/or language characterizations as search terms. The auditing schedule may be based on periodic auditing, such as every 30 days, every 2 weeks, every quarter, etc., and/or the auditing schedule may be based on given dates and/or the occurrence of given events determined by the electronic device and/or by users of the electronic device. At step 22, the searches described above may be performed based at least in part on the auditing schedule and search results may be returned for each such search. An individual tasked with reviewing the search results, herein described as an auditor, may receive a notification, such as a notification sent to a device associated with the auditor, indicating that search results are pending review. The auditor may view some or all of the search results and indicate whether the search results correspond to the digital property, as described more fully herein.

Figure 3:
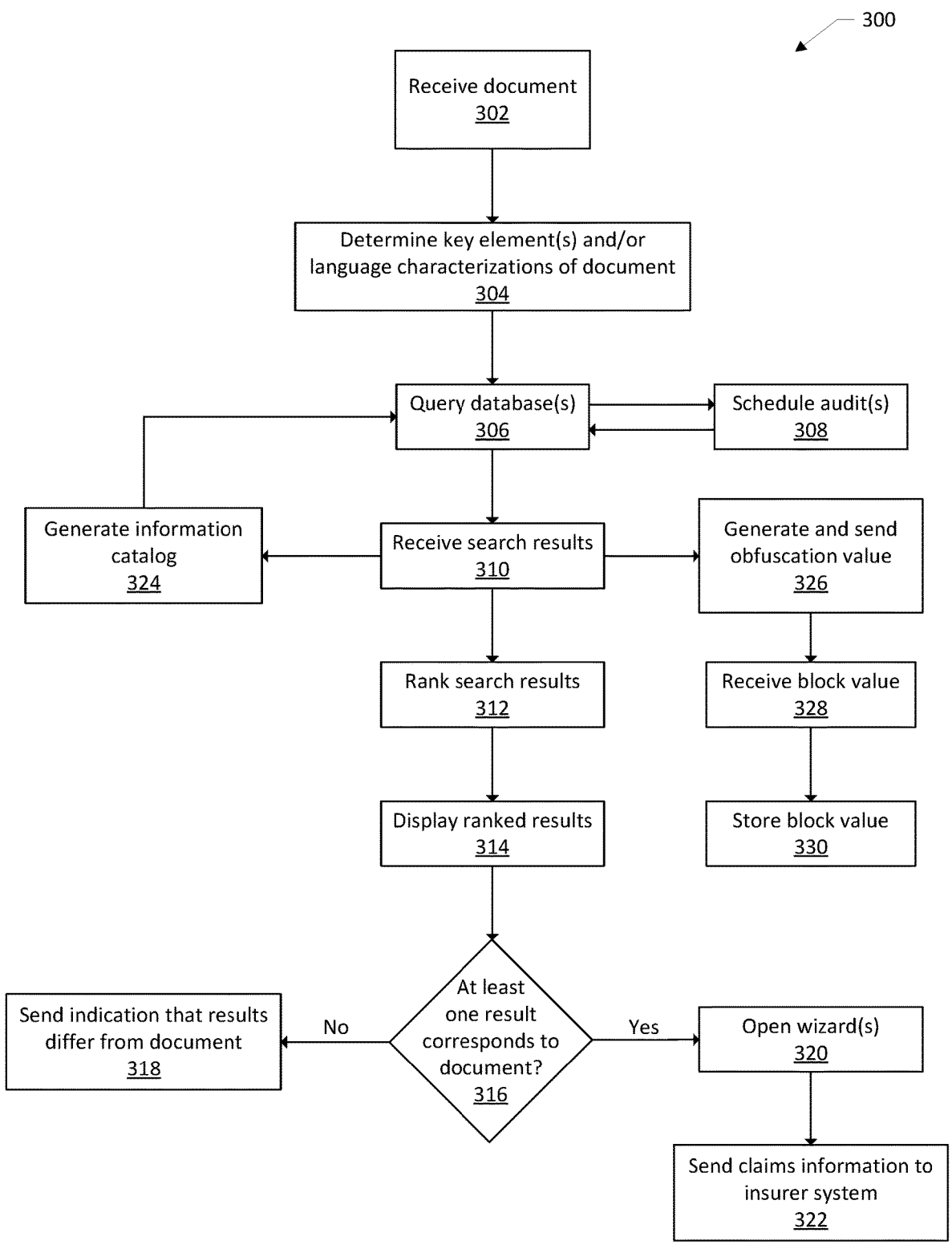
FIG. 3 illustrates a flow diagram of an example process for automated digital-property analysis.

FIG. 3 illustrates processes for automated digital-property analysis. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 4-9, although the processes may be implemented in a wide variety of other environments, architectures and systems.

FIG. 3 illustrates a flow diagram of an example process 300 for automated digital-property analysis. The order in which the operations or steps are described is not intended to be construed as a limitation, and any number of the described operations may be combined in any order and/or in parallel to implement process 300. The operations described with respect to the process 300 are described as being performed by the electronic device, and/or the registry system associated with the trade-secret registry, and/or a distributed-ledger system associated with a blockchain. However, it should be understood that some or all of these operations may be performed by some or all of components, devices, and/or systems described herein.

At block 302, the process 300 may include receiving a document representing a digital property. The "document" may be any data that has been indicated to be digital property. The document may include text data, image data, audio data, and/or other types of data, such as metadata.

At block 304, the process 300 may include determining one or more key elements and/or language characterizations of the document. For example, a language characterizer may utilize the document to generate one or more key words and/or language characterizations, also described herein as key elements and/or language characterizations associated with the document. For example, the language characterizer may determine key elements and/or language characterizations such as key words and/or language characterizations and/or phrases associated with the subject matter of the document. Additionally, or alternatively, an author-identification component may utilize the document to generate identification data that identifies one or more authors of the document. For example, the author-identification component may generate one or more author identifiers, such as identifiers of authors and/or creators of the document and/or subject matter associated with the document. The identifiers may include names and/or other identifying information associated with the authors and/or creators. Electronic devices associated with users of the system may display these key elements and/or language characterizations, such as via user interfaces, for a user of the electronic devices to review and/or change and/or confirm. In other examples, the electronic devices may provide functionality that allows a user of the electronic devices to provide input corresponding to the key elements and/or language characterizations such that the user identifies the key elements and/or language characterizations. The language characterizer and/or the author-identification component may provide the key elements and/or language characterizations to the query component.

In examples, determining the key words and/or language characterizations may include identifying, determining, and/or generating text data representing the document. The text data may represent text of the document, objects depicted in image data of the document, and/or speech corresponding to audio data of the document. At least one of term-frequency inverse-document-frequency analysis, word-vectoring analysis, and/or named-entity-recognition analysis may be performed on the text data to determine the key words and/or language characterizations.

At block 306, the process 300 may include querying one or more databases for relevant search results associated with the key elements and/or language characterizations. For example, a query component may be configured to receive the key elements and/or language characterizations from the language characterizer and/or the author-identification component and to perform searches of the one or more internal databases and/or external databases, and may return search results that are relevant to a given query. The query component may utilize keyword searching techniques, such as searching for a specific word and/or phrase corresponding to a key element, excluding and/or including additional terms associated with key elements and/or language characterizations, searching related links and/or items indicated as relevant, searching for omitted words associated with key elements and/or language characterizations, searching by specific file type, searching by image comparison, etc. It should be understood that instead of generating key elements and/or language characterizations as described above and utilizing the key elements and/or language characterizations to perform the searches, the query component may utilize the document itself as the search query.

At block 308, in examples, the process 300 may include scheduling one or more subsequent audits wherein the one or more databases are searched for relevant information using the key elements and/or language characterizations on a scheduled basis. The auditing schedules may be utilized to invoke a querying component to conduct the subsequent searching of the databases.

At block 310, the process 300 may include receiving search results from querying the databases. The search results may be in the form of items and/or resources and/or other information.

At block 312, the process 300 may include ranking the search results. For example, the query component may be configured to rank search results such that the most relevant results are ranked more favorably than less relevant results. Ranking of search results may be performed using one or more ranking techniques and/or factors, such as the prevalence of a key element and/or language characterization in a given result, the number of key elements and/or language characterizations in a given result, a similar syntax and/or diction associated with the key elements and/or language characterizations, an amount of time from when the search is performed and when the result was generated and/or modified. Some specific techniques to perform the searching and/or ranking functionality may include term-frequency inverse-document-frequency techniques, word vectoring approaches, named-entity recognition, computer vision techniques, and/or ensembles thereof, for example.

At block 314, the process 300 may include displaying the ranked results. For example, the results, as ranked, may be caused to be displayed on one or more displays via the user interfaces. In examples, a link or resource locator may be displayed for some or all of the items associated with the search results. In other examples, the items themselves and/or portions of the items may be displayed for some or all of the items. A relevancy score may be determined for some or all of the search results, and the relevancy score may be utilized to determine which search results are most relevant and therefore will be displayed, and which search results are less relevant and therefore will not be displayed (or will be displayed secondarily). For example, a threshold relevancy score, such as 85%, may be set and only search results with relevancy scores meeting or exceeding that threshold relevancy score may be displayed. In other examples, a number of search results may be set and only that number of the most relevant search results may be displayed. For example, a limit of 20 results may be set and only the 20 search results with the highest relevancy scores may be displayed.

At block 316, the process 300 may include determining whether at least one result corresponds to the document representing the digital property. For example, the user interfaces may, in addition to displaying the search results, display one or more options to provide input associated with the search results. The options may include indicating that a given search result does or does not correspond to the digital property in question. For example, a user may view a given search result to determine whether the search result matches or corresponds to the digital property. In examples where the search result does not correspond to the digital property, the user may provide input indicating as much. In examples where the search result does correspond to the digital property, the user may provide input indicating as much. The user interface may also display information indicating which search results have been reviewed and/or which search results have been marked or otherwise indicated to differ from or correspond to the digital property. This may provide the user of the electronic device with an indication of which search results still need to be reviewed and/or which search results are potentially problematic.

If at least one results does not correspond to the document, then at block 318, the process 300 may include sending an indication that the results differ from the document to one or more other components of the system and/or one or more other systems, such as the trade secret registry system and/or the insurer system. In examples where none of the search results correspond to the digital property, an indication of this determination may be sent to the trade secret registry system, and/or the indication may be sent to the insurer system associated with an insurer of the digital property, if any. This information may be utilized by the entity and/or the trade secret registry system to determine whether to register the digital property with the trade-secret registry. This information may additionally, or alternatively, be utilized by the entity and/or the insurer system to determine whether to seek and/or provide insurance coverage for the digital property, and/or to set policy limits and/or conditions and/or parameters for coverage of the digital property.

Returning to block 316, if at least one result corresponds to the document, then at block 320, the process 300 may include opening one or more wizards. For example, the one or more wizards may be enabled and may present the options of deregistering the digital property with the trade-secret registry, marking the digital property as disclosed, altering one or more parameters (such as value) of the digital property, notifying the insurer system of the disclosure, and/or canceling an insurance policy associated with the digital property, for example. In examples where the disclosure amounts to a potential misappropriation of the digital property, the user interface may display functionality that allows the auditor to select options for actions to the taken. The one or more wizards may be enabled and may present the options of providing information for making an insurance claim, notifying the insurer system of the potential misappropriation, and/or retrieving and/or generating information associated with the discovery of the potential misappropriation to be stored and utilized if needed, such as during litigation. The wizards as described herein may be a set of dialog boxes and/or input fields configured to be displayed, such as via the electronic device. For example, a wizard may be utilized to receive user input for insurance policy application, underwriting, and provision. In examples where a wizard is utilized for insurance policy provision, the wizard and/or information associated with the wizard may be provided by and/or may be specific to a given insurer. Additionally, or alternatively, a wizard may be utilized to submit a notice of a potential misappropriation event and/or an insurance claim, as described more fully herein.

At block 322, the process 300 may include sending claims information to the insurer system. For example, the input data representing the input to the one or more input fields may be sent as claims information to the insurer system.

Returning to block 310, the process 300 may, in examples, include, at block 324, generating an information catalog associated with the query. For example, a scheduling component may be configured to identify, determine, and/or generate auditing schedules for performing searches associated with the digital property. For example, audits associated with the digital property may be scheduled utilizing the key elements and/or language characterizations described herein. For example, in addition to or instead of performing the digital-property analysis described above at the time that a digital property is to be registered with the trade-secret registry or otherwise identified as a trade secret and/or valuable item, the digital-property analysis may be performed on a scheduled basis, such as periodically, as a means to audit whether the digital property was disclosed in a manner that would render the digital property less valuable and/or terminate its status as, for example, a trade secret. The scheduling component and/or users of the electronic device may identify and/or determine an auditing schedule for performing searches utilizing the key elements and/or language characterizations as search terms. The auditing schedule may be based on periodic auditing, such as every 30 days, every 2 weeks, every quarter, etc., and/or the auditing schedule may be based on given dates and/or the occurrence of given events determined by the electronic device and/or by users of the electronic device. The searches described above may be performed based at least in part on the auditing schedule and search results may be returned for each such search. An individual tasked with reviewing the search results, herein described as an auditor, may receive a notification, such as a notification sent to a device associated with the auditor, indicating that search results are pending review. The auditor may view some or all of the search results and indicate whether the search results correspond to the digital property, as described more fully herein.

The outcome of a given scheduled search may be that none of the results correspond to the digital property. However, in other examples, the outcome of a given scheduled search may be that at least one of the results corresponds to the digital property. In these examples, information about the source of the search result in question may be displayed via the user interface, which may assist the auditor in determining whether the disclosure of the digital property amounts to an unintentional but lawful disclosure or a potential misappropriation of the digital property. The user interface may provide functionality to allow the user to indicate which of the situations is relevant for a given disclosure. In examples where the disclosure was unintentional but lawful, the user interface may display functionality that allows the auditor to select options for actions to be taken.

At block 326, the process 300 may include generating and sending an obfuscation value to a distributed-ledger system. For example, an obfuscation component may be configured to generate an obfuscation value, which may be a hash value, that corresponds to the digital property, the key elements and/or language characterizations, identifiers of the analyzed databases, the search results, the ranking of search results, and/or the indications provided by the auditor in association with review of the search results. The obfuscation value may correspond to a unique identifier of a given analysis. The obfuscation component may receive data corresponding to the document, such as from one or more databases and/or other storage locations associated with the electronic device and/or remote storage accessible by the electronic device. The obfuscation value may be sent to the distributed-ledger system associated with a distributed ledger. The distributed-ledger system may register the obfuscation value with a block of the blockchain and may generate a block value corresponding to the block of the blockchain at which the obfuscation value is registered.

At block 328, the process 300 may include receiving the block value. For example, the distributed-ledger system may send the block value back to the electronic device and/or the trade secret registry system along with, in some examples, a timestamp associated with registration of the obfuscation value with the distributed ledger.

At block 330, the process 300 may include storing the block value in association with the obfuscation value and/or a record associated with the digital property and/or the performed digital-property analysis. The block value may be utilized to provide a verifiable indication of when a given digital-property analysis was performed and the attributes of the analysis.

Figure 4:
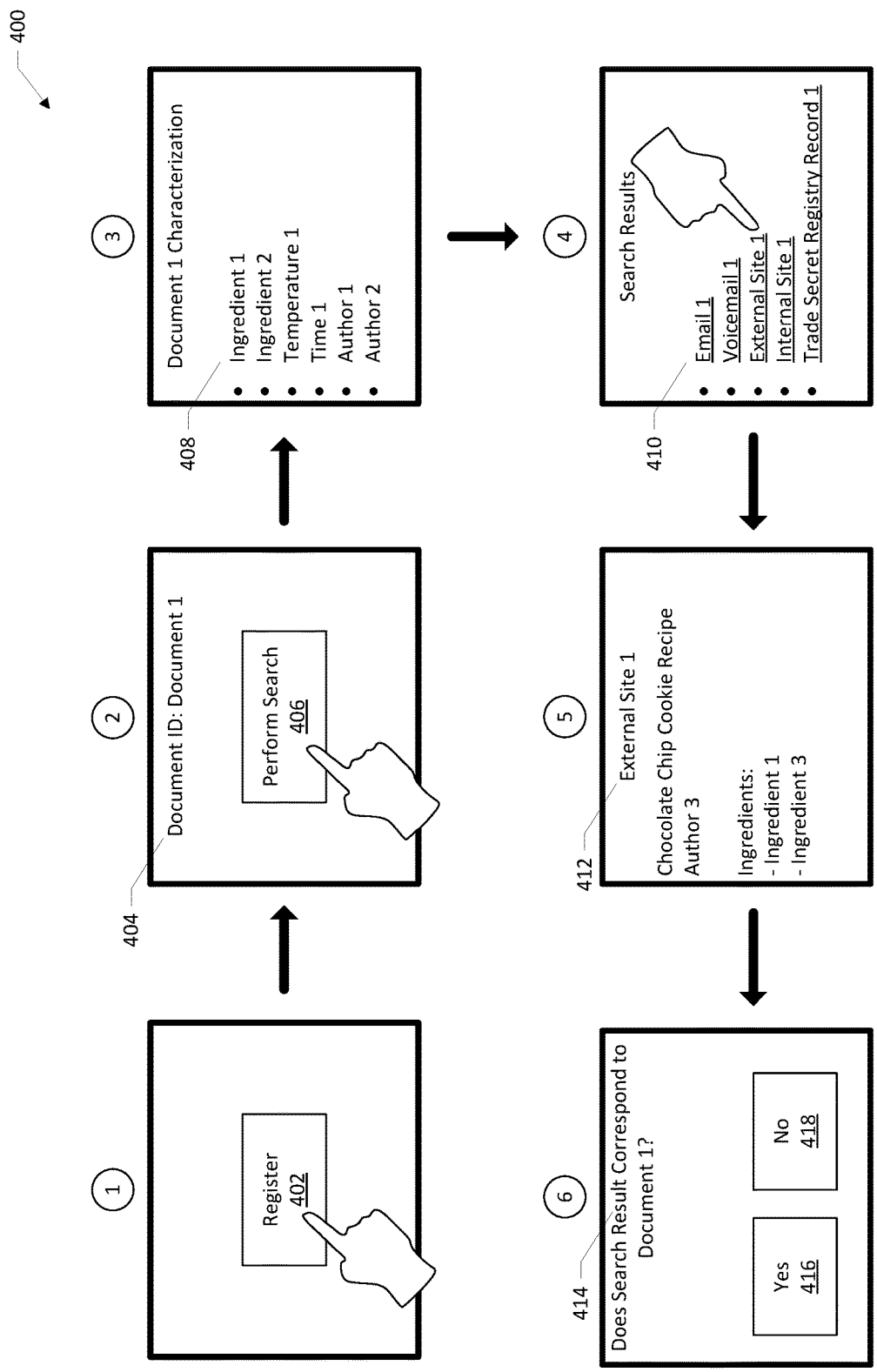
FIG. 4 illustrates an example user interface associated with systems for automated-digital-property analysis.

FIG. 4 illustrates an example user interface 400 associated with systems for automated-digital-property analysis. The user interface 400 may be displayed on a display of an electronic device, such as the electronic device 102 as described with respect to FIG. 1. The user interface 400 may be the same as or similar to the user interface(s) 140 as described with respect to FIG. 1. FIG. 4 illustrates a progression, from left to right and top to bottom, of information displayed on and/or interactions with the user interface 400.

For example, the user interface 400, at step 1, may include a first option to register a document representing a digital property with a trade-secret registry. In these examples, the document may be selected and/or may be received and/or retrieved by the electronic device 102. Identifying information and/or auxiliary information associated with the document may be provided and input data corresponding to this information may be generated. The auxiliary information may include a date the document was generated, a relative importance of the document to the entity, an indicator of a version of the document, a value of the document, etc.

At step 2, the user interface 400 may cause display of a document identifier 404, which may provide a visual indication of the document in question that is to be registered with the trade-secret registry. Additionally, an option 406 to perform a search for document and/or information that might be relevant to the document may be caused to be displayed. A user may provide input indicating selection of the option.

At step 3, the user interface 400 may cause display of one or more key elements and/or language characterizations 408 associated with the document. For example, the systems may determine key elements and/or language characterizations 408 such as key words and/or language characterizations and/or phrases associated with the subject matter of the document. Additionally, or alternatively, the systems may determine key elements and/or language characterizations 408 such as identifiers of authors and/or creators of the document and/or subject matter associated with the document. The identifiers may include names and/or other identifying information associated with the authors and/or creators. These key elements and/or language characterizations 408 may be displayed, such as via the user interface 400, for a user of the system to review and/or change and/or confirm. In other examples, the system may provide functionality that allows a user of the system to provide input corresponding to the key elements and/or language characterizations 408 such that the user identifies the key elements and/or language characterizations 408. In the example shown in FIG. 4, the key elements and/or language characterizations 408 determined for the document "Document 1" are "Ingredient 1," "Ingredient 2," Temperature 1," "Time 1," "Author 1," and "Author 2."

At step 4, the user interface 400 may cause display of indicators of search results 410 associated with the search of databases utilizing the key elements and/or language characterizations 408. The search results 410 may be ranked such that the most relevant results 410 are ranked more favorably than less relevant results 410. The results 410, as ranked, may be caused to be displayed on one or more devices associated with the entity. In examples, a link or resource locator may be displayed for some or all of the items associated with the search results 410. In other examples, the items themselves and/or portions of the items may be displayed for some or all of the items. A relevancy score may be determined for some or all of the search results 410, and the relevancy score may be utilized to determine which search results 410 are most relevant and therefore will be displayed, and which search results 410 are less relevant and therefore will not be displayed (or will be displayed secondarily). For example, a threshold relevancy score may be set and only search results 410 with relevancy scores meeting or exceeding that threshold relevancy score may be displayed. In other examples, a number of search results 410 may be set and only that number of the most relevant search results 410 may be displayed. For example, a limit of 20 results may be set and only the 20 search results 410 with the highest relevancy scores may be displayed. As shown in FIG. 4, the search results 410 include "Email 1," "Voicemail 1," "External Site 1," "Internal Site 1," and "Trade Secret Registry Record 1." As evidenced by the labels of these search results 410, the query may include a query of one or more internal resources, such as internal websites and/or resources, one or more external databases, and/or databases associated with intellectual property and/or digital property registries.

A user may select one or more of the search result indicators, and, at step 5, the user interface 400 may cause display of the selected result 412. The selected result 412 may include the information making up and/or associated with the document for the user of the user interface 400 may review. In the example of FIG. 4, the selected result 412 includes a recipe for chocolate chip cookies, as created by "Author 3," that lists ingredients such as "Ingredient 1" and "Ingredient 3." The user of the user interface 400 may review the selected result 412 and may determine whether the selected result 412 corresponds to the digital property.

At step 6, the user interface 400 may display a request 414 to indicate whether the viewed search result corresponds to the digital property. Here, the request 414 includes the text "Does Search Result Correspond to Document 1?" The wording and/or presentation of the request 414 may vary, and the text provided in FIG. 4 is provided by way of example only. The user interface 400 may also include a yes option 416 and a no option 418 that may selectable for the user to indicate whether the viewed result corresponds to the searched document. In the example of FIG. 4, while some similarity is exhibited between the selected result 412 and Document 1 (e.g., they both include "Ingredient 1"), the two documents do not match or otherwise correspond to each other. As such, the user may select the no option 418 to generate an indication that the documents do not correspond.

Figure 5:
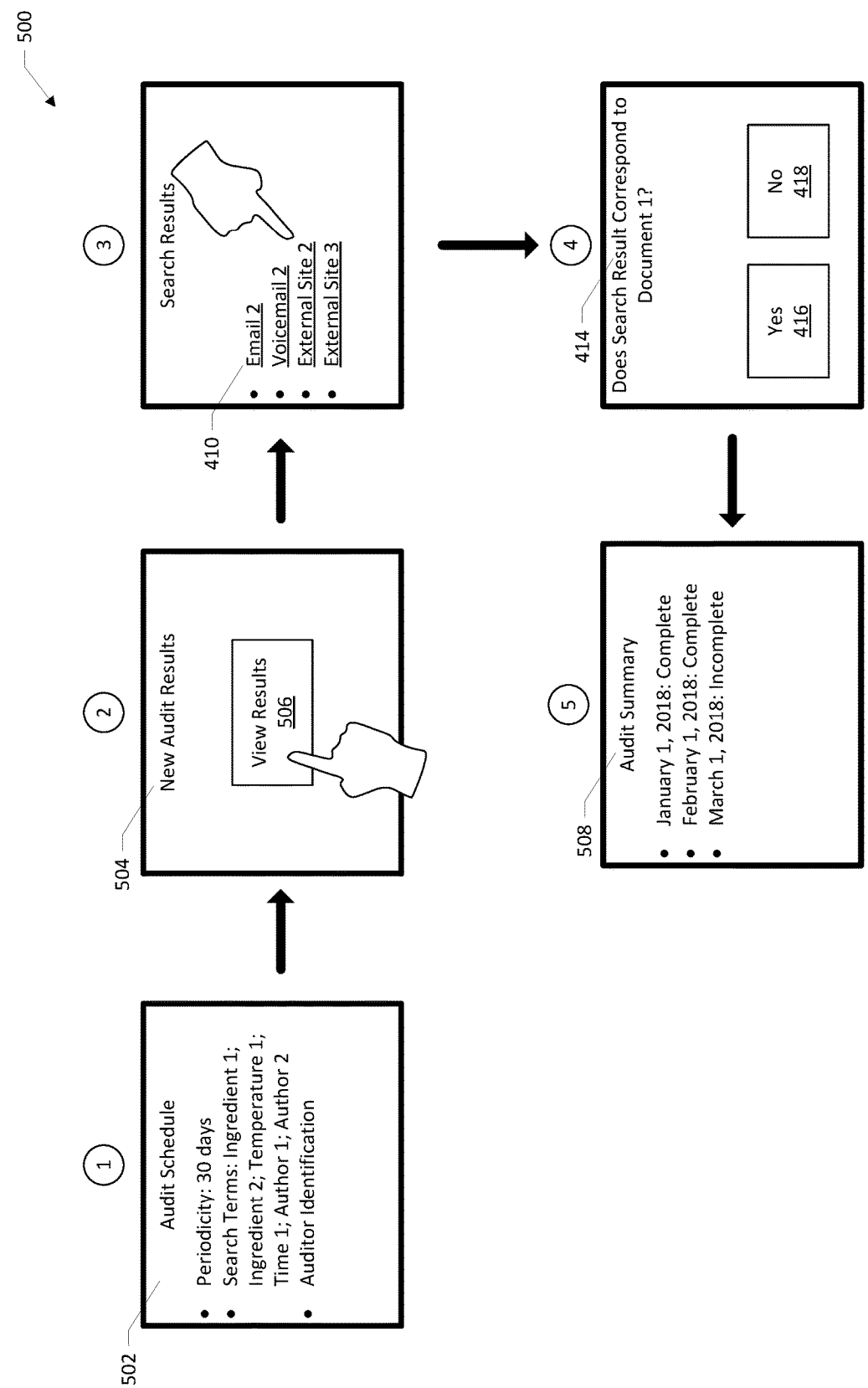
FIG. 5 illustrates an example user interface showing audit scheduling associated with systems for automated digital-property analysis.

FIG. 5 illustrates an example user interface 500 showing audit scheduling associated with systems for automated digital-property analysis. The user interface 500 may be displayed on a display of an electronic device, such as the electronic device 102 as described with respect to FIG. 1. The user interface 500 may be the same as or similar to the user interface(s) 140 as described with respect to FIG. 1. FIG. 5 illustrates a progression, from left to right and top to bottom, of information displayed on and/or interactions with the user interface 500.

For example, the user interface 500, at step 1, may include causing display of an audit schedule 502 associated with searching of one or more databases for information relevant to one or more key elements and/or language characterizations associated with a document representing a digital property. The audit schedule 502 may include an indication of the periodicity and/or frequency of performing the search, the search terms (e.g., the key elements and/or language characterizations) to be searched for, and/or an identifier of the auditor and/or the user profile associated with the auditor that is to receive the search results for purposes of determining whether any of the results correspond to the document. The attributes of the audit schedule 502 may be generated and/or identified manually by a user, or, in other examples, the attributes may be automatically generated based at least in part on a type of the document, one or more previously-generated audit schedules associated with the entity and/or associated with the type of the document, governmental regulation and/or statutes, etc.

At step 2, a query may be performed of the one or more databases pursuant to the attributes of the audit schedule 502. The user interface 500 may cause display of a notification 504 that audit results are available for viewing. For example, utilizing the auditor identification, the notification 504 may be sent to an electronic device associated with the auditor identification, which may cause an application residing on the electronic device to initiate and cause display of the user interface 500. The user interface 500 may also include a view-results option 506, which may be selectable to cause one or more of the results of the audit to be displayed.

At step 3, the user interface 500 may cause display of indicators of search results 410 associated with the search of databases utilizing the key elements and/or language characterizations. The search results 410 may be ranked such that the most relevant results 410 are ranked more favorably than less relevant results 410. The results 410, as ranked, may be caused to be displayed on one or more devices associated with the entity. In examples, a link or resource locator may be displayed for some or all of the items associated with the search results 410. In other examples, the items themselves and/or portions of the items may be displayed for some or all of the items. A relevancy score may be determined for some or all of the search results 410, and the relevancy score may be utilized to determine which search results 410 are most relevant and therefore will be displayed, and which search results 410 are less relevant and therefore will not be displayed (or will be displayed secondarily). For example, a threshold relevancy score may be set and only search results 410 with relevancy scores meeting or exceeding that threshold relevancy score may be displayed. In other examples, a number of search results 410 may be set and only that number of the most relevant search results 410 may be displayed. For example, a limit of 20 results may be set and only the 20 search results 410 with the highest relevancy scores may be displayed. As shown in FIG. 5, the search results 410 include "Email 2," "Voicemail 2," "External Site 2," and "External Site 3." A user may select one or more of the search result indicators, and the user interface 500 may cause display of the search results as described more fully with respect to FIG. 4.

At step 4, the user interface 500 may display a request 414 to indicate whether the viewed search result corresponds to the digital property. Here, the request 414 includes the text "Does Search Result Correspond to Document 1?" The wording and/or presentation of the request 414 may vary, and the text provided in FIG. 5 is provided by way of example only. The user interface 500 may also include a yes option 416 and a no option 418 that may selectable for the user to indicate whether the viewed result corresponds to the searched document.

At step 5, the user interface 500 may display an audit summary 508, which may include information indicating one or more audits that have been performed along with information associated with the audits. The information may include a date on which the audit was performed along with an indicator of whether review of the search results for a given audit has been completed. Portion of the audit summary 508 may be selectable such that the search results for a selected audit may be displayed for review.

Figure 6:
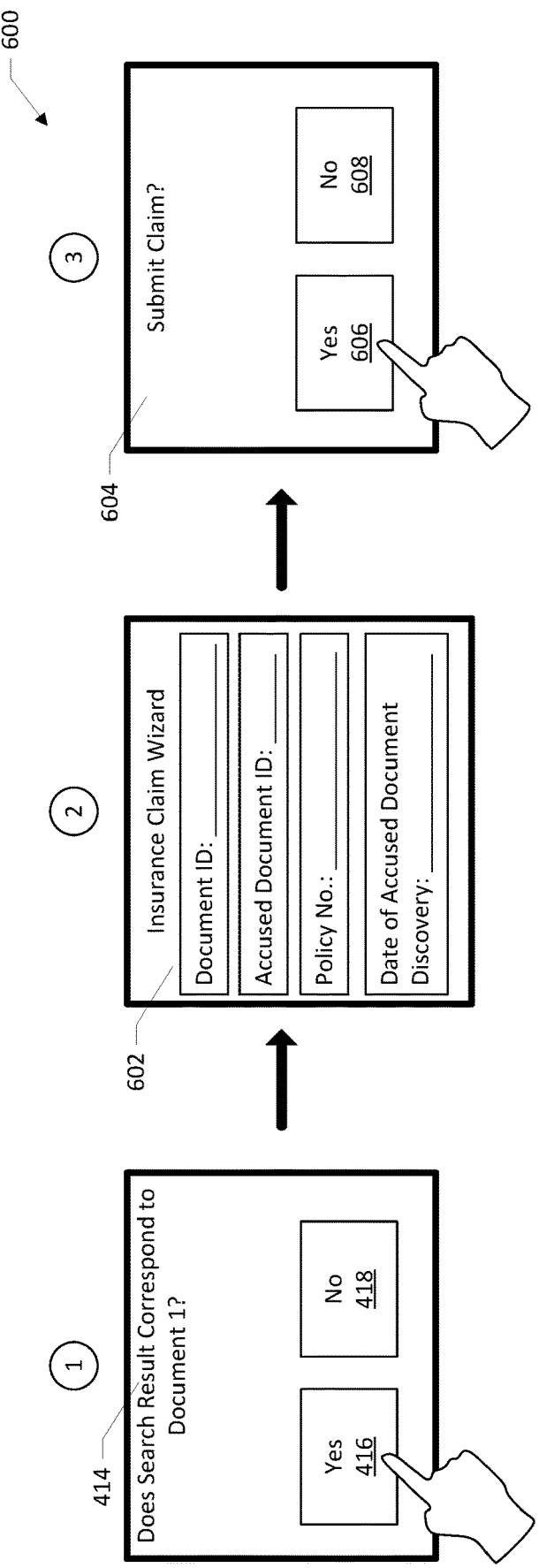
FIG. 6 illustrates an example user interface showing insurance claim provisioning associated with systems for automated digital-property analysis.

FIG. 6 illustrates an example user interface 600 showing insurance claim provisioning associated with systems for automated digital-property analysis. The user interface 600 may be displayed on a display of an electronic device, such as the electronic device 102 as described with respect to FIG. 1. The user interface 600 may be the same as or similar to the user interface(s) 140 as described with respect to FIG. 1. FIG. 6 illustrates a progression, from left to right, of information displayed on and/or interactions with the user interface 600.

For example, the user interface 600, at step 1, may include causing display of a request 414 to indicate whether viewed search results correspond to the digital property. Here, the request 414 includes the text "Does Search Result Correspond to Document 1?" The wording and/or presentation of the request 414 may vary, and the text provided in FIG. 6 is provided by way of example only. The user interface 600 may also include a yes option 416 and a no option 418 that may selectable for the user to indicate whether the viewed result corresponds to the searched document. In the example of FIG. 6, the user may select the yes option 416, indicating that the search result corresponds to or matches the document in question.

At step 2, the user interface 600 may cause display of one or more input fields 602 associated with an insurance claim wizard. The input fields 602 may include a question and/or request for information and a portion that allows for input to be received. In the example of FIG. 6, the input fields 602 include requests for the "Document ID," "Accused Document ID," Policy No.," and "Date of Accused Document Discovery." It should be understood that the wording of the fields is provided by way of example and any wording may be utilized. Additionally, while example types of requests have been provided in FIG. 6, it should be understood that other types of requests and/or questions may be presented. A user may provide input in response to the requests in the input fields, and corresponding input data may be generated.

At step 3, once input has been provided for the input fields, the user interface 600 may cause display of a claim-submission request 604, which may include a yes option 606 and a no option 608. The user may provide input to either of the options. In examples where the input indicates that the claim should be submitted, the claims information, including the input to the input fields 602 may be sent to an insurer system associated with the insurer that issued the insurance policy associated with the digital property.

Figure 7:
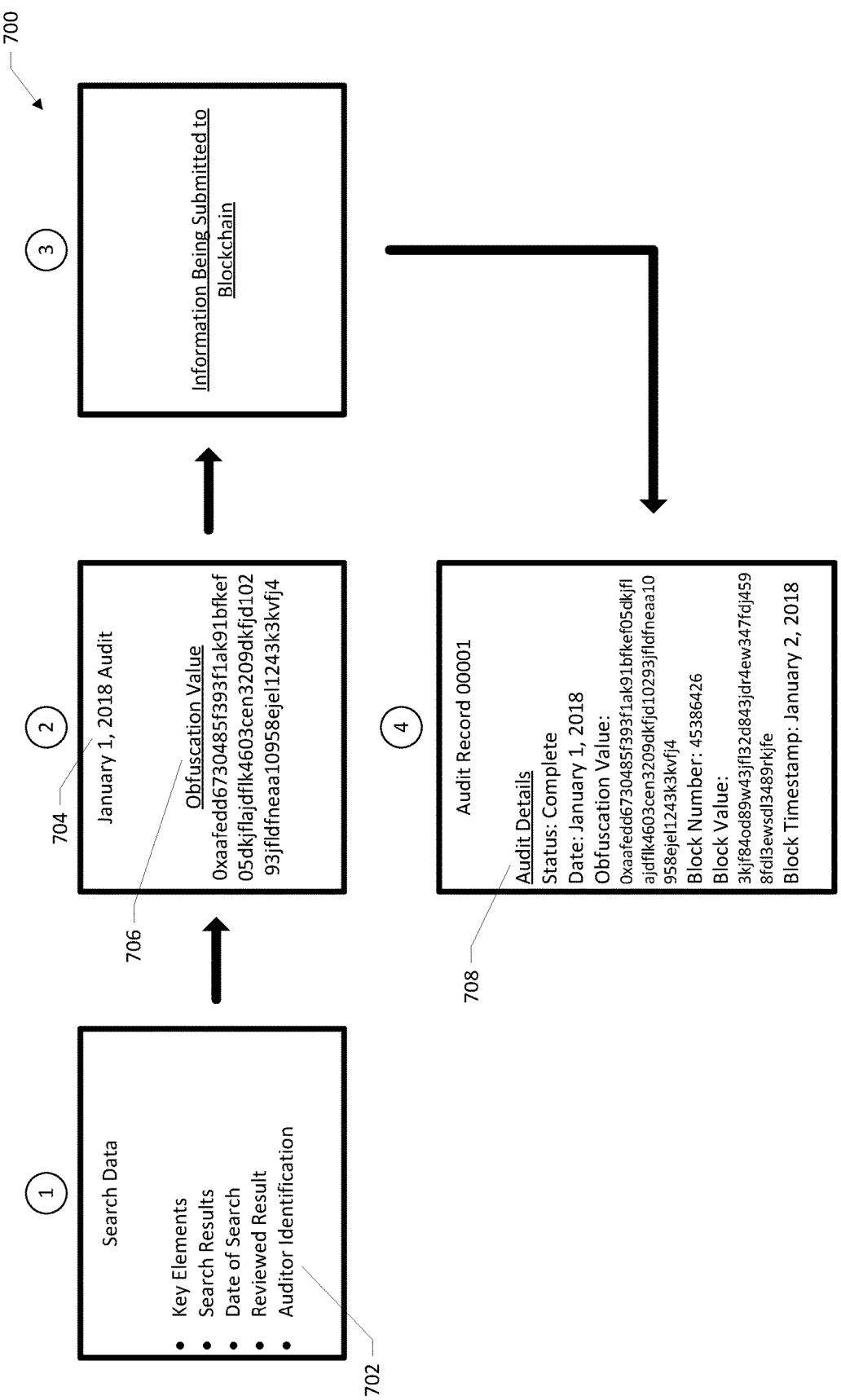
FIG. 7 illustrates an example user interface showing registration of auditing information with a distributed-ledger system.

FIG. 7 illustrates an example user interface 700 showing submission of auditing information to a distributed-ledger system. The user interface 700 may be displayed on a display of an electronic device, such as the electronic device 102 as described with respect to FIG. 1. The user interface 700 may be the same as or similar to the user interface(s) 140 as described with respect to FIG. 1. FIG. 7 illustrates a progression, from left to right and top to bottom, of information displayed on and/or interactions with the user interface 700.

For example, the user interface 700, at step 1, may include causing display of search data 702 associated with a given query. For example, the search data 702 may include key elements and/or language characterizations, search results, date of search, reviewed results, and/or auditor identification. This information, or a portion thereof, may be utilized for scheduling subsequent audits, generating information catalogs, and/or confirming that a digital property was not disclosed at the time of the search. To assist in verifying the search, an obfuscation value representing the search or components thereof may be registered with a distributed-ledger system.

At step 2, the user interface 700 may cause display of an audit identifier 704 for a given audit. An obfuscation value 706 may be generated from the search data 702 and representing the search data 702. Generation of obfuscation values is described in more detail above with respect to FIG. 1. The obfuscation value 706 may be displayed via the user interface 700.

At step 3, the obfuscation value 706 may be submitted to a distributed-ledger system 106 for registration on a blockchain of the system 108. An indicator that the obfuscation value is being submitted to the blockchain may be presented to indicate to a user that processing is in progress.

At step 4, a block value representing a block in the blockchain where the obfuscation value 706 is registered may be received from the distributed-ledger system 106 and may be displayed via the user interface 700. The block value may be a portion of audit details 708 displayed via the user interface 700. The audit details 708 may include a status of the audit, a date the audit was conducted, the obfuscation value 706, the block value, a block number, and/or a block timestamp. This information may be stored in association with a record for the digital property in a trade secret registry system and/or in association with the electronic device from which the document was provided.

Figure 8:
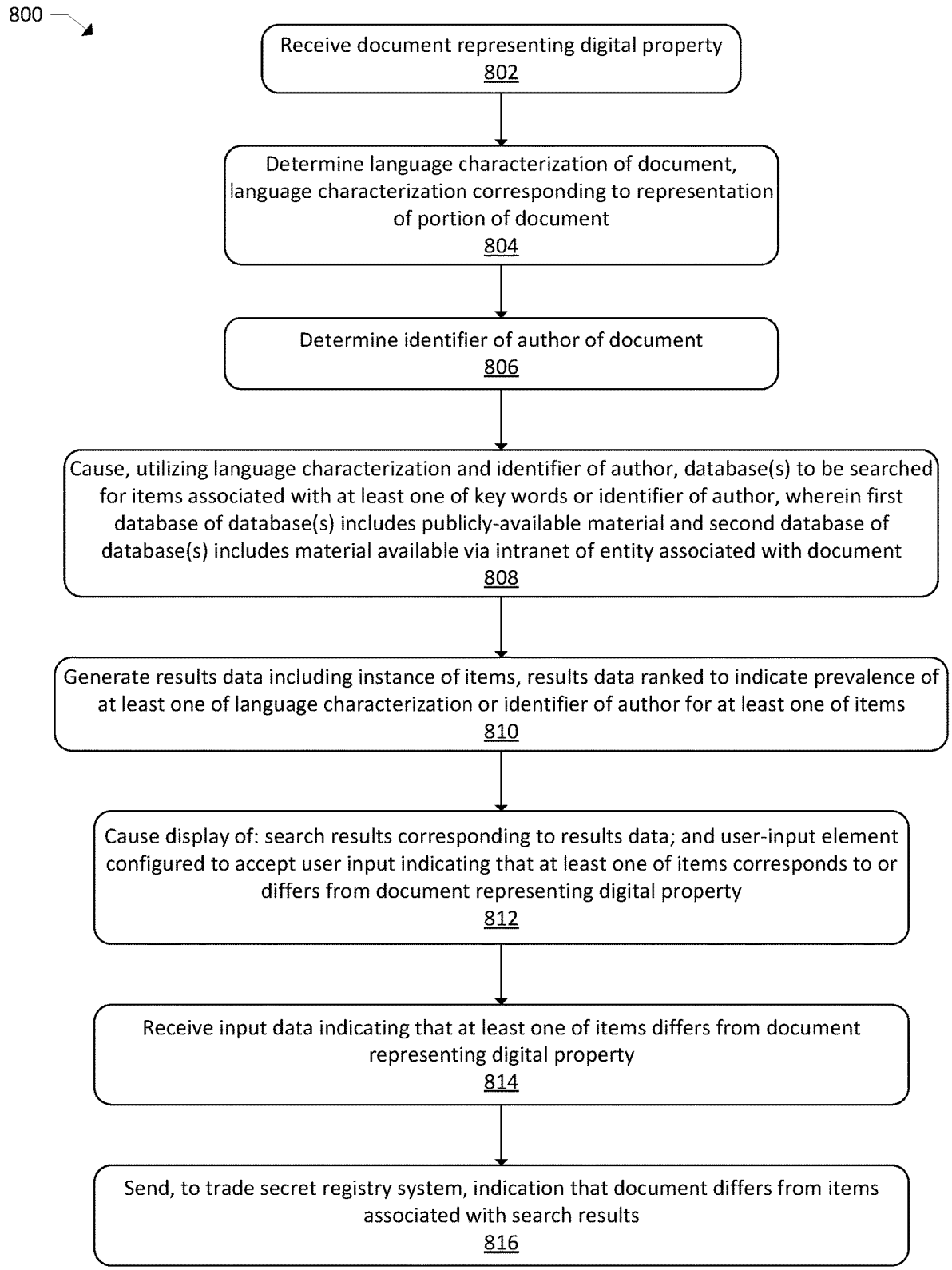
FIG. 8 illustrates a flow diagram of an example process for automated digital-property analysis.
Figure 9:
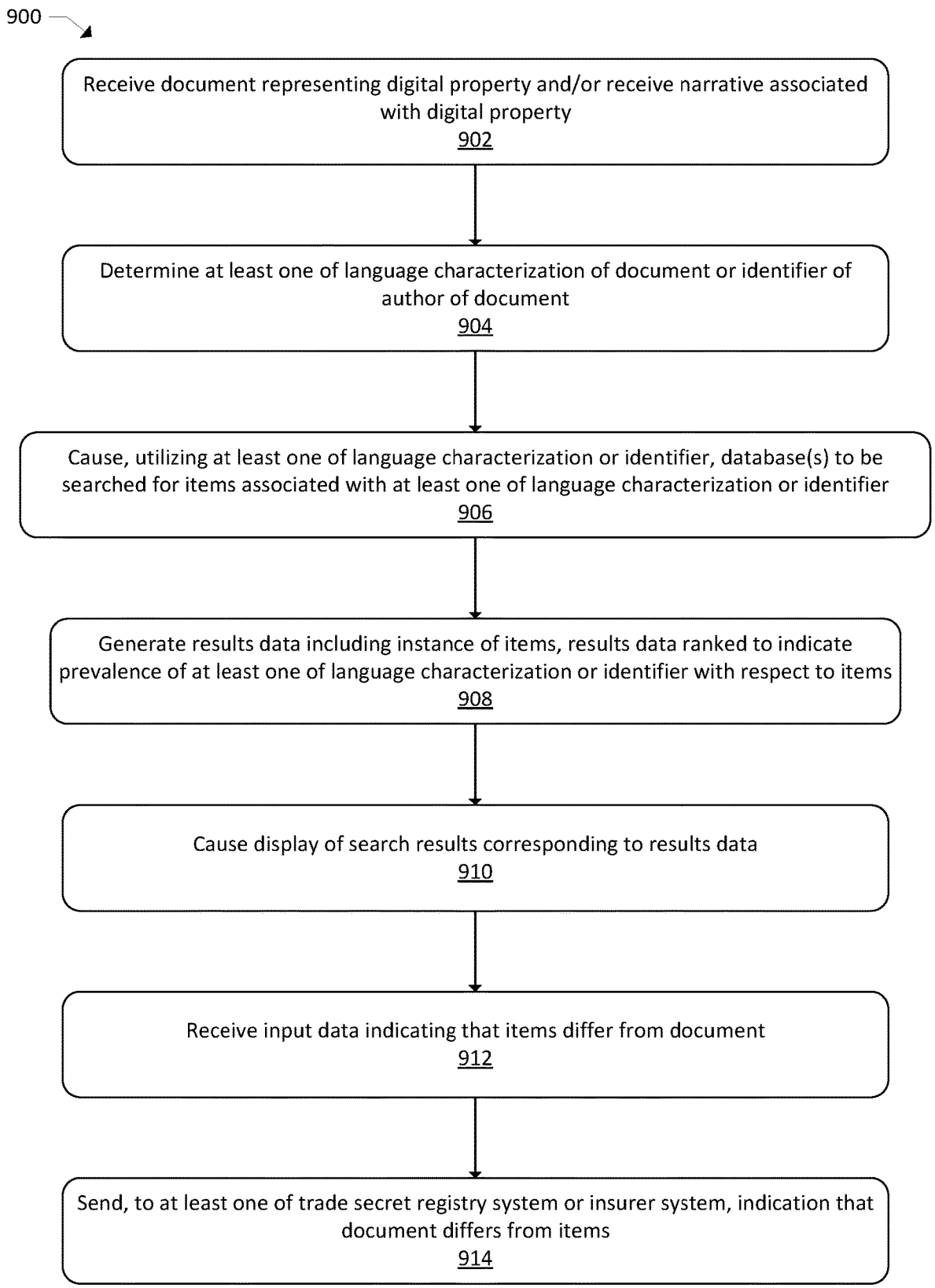
FIG. 9 illustrates a flow diagram of another example process for automated digital-property analysis.

FIGS. 8 and 9 illustrates processes for automated digital-property analysis. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

FIG. 8 illustrates a flow diagram of an example process 800 for automated digital-property analysis. The order in which the operations or steps are described is not intended to be construed as a limitation, and any number of the described operations may be combined in any order and/or in parallel to implement process 800.

At block 802, the process 800 may include receiving a document representing a digital property. The "document" may be any data that has been indicated to be digital property. The document may include text data, image data, audio data, and/or other types of data, such as metadata.

At block 804, the process 800 may include determining key words and/or language characterizations of the document, the key words and/or language characterizations corresponding to a representative portion of the document. For example, a language characterizer may receive a document representing a digital property and may utilize the document to generate one or more key words and/or language characterizations, also described herein as key elements and/or language characterizations associated with the document. For example, the language characterizer may determine key elements and/or language characterizations such as key words and/or language characterizations and/or phrases associated with the subject matter of the document. Electronic devices associated with users of the system may display these key elements and/or language characterizations, such as via user interfaces, for a user of the electronic devices to review and/or change and/or confirm. In other examples, the electronic devices may provide functionality that allows a user of the electronic devices to provide input corresponding to the key elements and/or language characterizations such that the user identifies the key elements and/or language characterizations.

At block 806, the process 800 may include determining an identifier of an author of the document. For example, an author-identification component may generate one or more author identifiers, such as identifiers of authors and/or creators of the document and/or subject matter associated with the document. The identifiers may include names and/or other identifying information associated with the authors and/or creators. The electronic device may display these key elements and/or language characterizations, such as via the user interfaces, for a user of the electronic devices to review and/or change and/or confirm. In other examples, the electronic devices may provide functionality that allows a user of the electronic devices to provide input corresponding to the key elements and/or language characterizations such that the user identifiers the key elements and/or language characterizations.

At block 808, the process 800 may include causing, utilizing the key words and/or language characterizations and the identifier of the author, one or more databases to be searched for items associated with at least one of the key words and/or language characterizations or the identifier of the author, wherein a first database of the one or more databases includes publicly-available material and a second database of the one or more databases includes material available via an intranet of an entity associated with the document. For example, a query component may be configured to receive the key elements and/or language characterizations from the language characterizer and/or the author-identification component and to perform searches of the one or more internal databases and/or external databases, and may return search results that are relevant to a given query. The query component may utilize keyword searching techniques, such as searching for a specific word and/or phrase corresponding to a key element, excluding and/or including additional terms associated with key elements and/or language characterizations, searching related links and/or items indicated as relevant, searching for omitted words associated with key elements and/or language characterizations, searching by specific file type, searching by image comparison, etc. It should be understood that instead of generating key elements and/or language characterizations as described above and utilizing the key elements and/or language characterizations to perform the searches, the query component may utilize the document itself as the search query.

At block 810, the process 800 may include generating results data including an instance of the items, the results data being ranked to indicate a prevalence of the at least one of the key words and/or language characterizations or the identifier of the author for individual ones of the items. The search results may be in the form of items and/or resources and/or other information. The search results may also be ranked. For example, the query component may be configured to rank search results such that the most relevant results are ranked more favorably than less relevant results. Ranking of search results may be performed using one or more ranking techniques and/or factors, such as the prevalence of a key element and/or language characterization in a given result, the number of key elements and/or language characterizations in a given result, a similar syntax and/or diction associated with the key elements and/or language characterizations, an amount of time from when the search is performed and when the result was generated and/or modified. Some specific techniques to perform the searching and/or ranking functionality may include term-frequency inverse-document-frequency techniques, word vectoring approaches, named-entity recognition, computer vision techniques, and/or ensembles thereof, for example.

At block 812, the process 800 may include causing display of: search results corresponding to the results data;

and a user-input element configured to accept user input indicating that individual ones of the items correspond to or differ from the document representing the digital property. For example, the results, as ranked, may be caused to be displayed on one or more displays via the user interfaces. In examples, a link or resource locator may be displayed for some or all of the items associated with the search results. In other examples, the items themselves and/or portions of the items may be displayed for some or all of the items. A relevancy score may be determined for some or all of the search results, and the relevancy score may be utilized to determine which search results are most relevant and therefore will be displayed, and which search results are less relevant and therefore will not be displayed (or will be displayed secondarily). For example, a threshold relevancy score, such as 85%, may be set and only search results with relevancy scores meeting or exceeding that threshold relevancy score may be displayed. In other examples, a number of search results may be set and only that number of the most relevant search results may be displayed. For example, a limit of 20 results may be set and only the 20 search results with the highest relevancy scores may be displayed.

Additionally, the user interfaces may, in addition to displaying the search results, display one or more options to provide input associated with the search results. The options may include indicating that a given search result does or does not correspond to the digital property in question. For example, a user may view a given search result to determine whether the search result matches or corresponds to the digital property. In examples where the search result does not correspond to the digital property, the user may provide input indicating as much. In examples where the search result does correspond to the digital property, the user may provide input indicating as much. The user interface may also display information indicating which search results have been reviewed and/or which search results have been marked or otherwise indicated to differ from or correspond to the digital property. This may provide the user of the electronic device with an indication of which search results still need to be reviewed and/or which search results are potentially problematic.

At block 814, the process 800 may include receiving input data indicating that the individual ones of the items differ from the document representing the digital property. For example, user input may be received that indicates the user selected an option to indicate that the items differ from the document representing the digital property.

At block 816, the process 800 may include sending, to a trade secret registry system, an indication that the document differs from the items associated with the search results. In examples where none of the search results correspond to the digital property, an indication of this determination may be sent to the trade secret registry system, and/or the indication may be sent to the insurer system associated with an insurer of the digital property, if any. This information may be utilized by the entity and/or the trade secret registry system to determine whether to register the digital property with the trade-secret registry. This information may additionally, or alternatively, be utilized by the entity and/or the insurer system to determine whether to seek and/or provide insurance coverage for the digital property, and/or to set policy limits and/or conditions and/or parameters for coverage of the digital property.

Additionally, or alternatively, the process 800 may include generating scheduling data representing a schedule for causing the one or more databases to be searched and causing, based at least in part on the scheduling data, the one or more databases to be searched utilizing the key words and/or language characterizations and the identifier of the author. The process 800 may also include generating additional results data based at least in part on causing the one or more databases to be searched and causing display of additional search results corresponding to the additional results data. The process 800 may also include causing display of the user-input element in association with the additional search results.

Additionally, or alternatively, the process 800 may include causing, at a time after the first search, the one or more databases to be searched for the items associated with the at least one of the key words and/or language characterizations or the identifier of the author. The process 800 may also include generating additional results data based at least in part on causing the one or more databases to be searched and causing display of additional search results corresponding to the additional results data. The process 800 may also include receiving second input data indicating that at least a portion of the additional search results corresponds to the document representing the digital property and causing, based at least in part on the second input data, display of a user interface including one or more fields associated with an insurance-policy claim related to the document.

Additionally, or alternatively, the process 800 may include sending, to at least one of the trade secret registry system or an insurer system, a first request for an insurance policy associated with the document representing the digital property. The process 800 may also include receiving, in response to the first request, a second request to indicate that the document has not been disclosed to third parties. In these examples, sending the indication that the document differs from the items associated with the search results comprises sending the indication in response to the second request.

FIG. 9 illustrates a flow diagram of another example process 900 for utilizing systems for automated digital-property analysis. The order in which the operations or steps are described is not intended to be construed as a limitation, and any number of the described operations may be combined in any order and/or in parallel to implement process 900.

At block 902, the process 900 may include receiving a document representing a digital property. The "document" may be any data that has been indicated to be digital property. The document may include text data, image data, audio data, and/or other types of data, such as metadata. Additionally, or alternatively, the process 900 may include receiving a narrative associated with the digital property, where the narrative may include a description of the digital property and/or information associated with the digital property.

At block 904, the process 900 may include determining at least one of a key word and/or language characterization of the document or an identifier of an author of the document. For example, a language characterizer may receive a document representing a digital property and may utilize the document to generate one or more key words and/or language characterizations, also described herein as key elements and/or language characterizations associated with the document. For example, the language characterizer may determine key elements and/or language characterizations such as key words and/or language characterizations and/or phrases associated with the subject matter of the document. Electronic devices associated with users of the system may display these key elements and/or language characterizations, such as via user interfaces, for a user of the electronic devices to review and/or change and/or confirm. In other examples, the electronic devices may provide functionality that allows a user of the electronic devices to provide input corresponding to the key elements and/or language characterizations such that the user identifies the key elements and/or language characterizations. Additionally, or alternatively, an author-identification component may generate one or more author identifiers, such as identifiers of authors and/or creators of the document and/or subject matter associated with the document. The identifiers may include names and/or other identifying information associated with the authors and/or creators. The electronic device may display these key elements and/or language characterizations, such as via the user interfaces, for a user of the electronic devices to review and/or change and/or confirm. In other examples, the electronic devices may provide functionality that allows a user of the electronic devices to provide input corresponding to the key elements and/or language characterizations such that the user identifiers the key elements and/or language characterizations.

At block 906, the process 900 may include causing, utilizing the at least one of the key word and/or language characterization or the identifier, one or more databases to be searched for items associated with the at least one of the key word and/or language characterization or the identifier. For example, a query component may be configured to receive the key elements and/or language characterizations from the language characterizer and/or the author-identification component and to perform searches of the one or more internal databases and/or external databases, and may return search results that are relevant to a given query. The query component may utilize keyword searching techniques, such as searching for a specific word and/or phrase corresponding to a key element, excluding and/or including additional terms associated with key elements and/or language characterizations, searching related links and/or items indicated as relevant, searching for omitted words associated with key elements and/or language characterizations, searching by specific file type, searching by image comparison, etc. It should be understood that instead of generating key elements and/or language characterizations as described above and utilizing the key elements and/or language characterizations to perform the searches, the query component may utilize the document itself as the search query.

At block 908, the process 900 may include generating results data including an instance of the items, the results data ranked to indicate a prevalence of the at least one of the key word and/or language characterization or the identifier for individual ones of the items.

At block 910, the process 900 may include causing display of search results corresponding to the results data. The search results may be in the form of items and/or resources and/or other information. The search results may also be ranked. For example, the query component may be configured to rank search results such that the most relevant results are ranked more favorably than less relevant results. Ranking of search results may be performed using one or more ranking techniques and/or factors, such as the prevalence of a key element and/or language characterization in a given result, the number of key elements and/or language characterizations in a given result, a similar syntax and/or diction associated with the key elements and/or language characterizations, an amount of time from when the search is performed and when the result was generated and/or modified. Some specific techniques to perform the searching and/or ranking functionality may include term-frequency inverse-document-frequency techniques, word vectoring approaches, named-entity recognition, computer vision techniques, and/or ensembles thereof, for example.

At block 912, the process 900 may include receiving input data indicating that the individual ones of the items differ from the document. For example, user input may be received that indicates the user selected an option to indicate that the items differ from the document representing the digital property.

At block 914, the process 900 may include sending, to at least one of a trade secret registry system or an insurer system, an indication that the document differs from the items associated with the search results. In examples where none of the search results correspond to the digital property, an indication of this determination may be sent to the trade secret registry system, and/or the indication may be sent to the insurer system associated with an insurer of the digital property, if any. This information may be utilized by the entity and/or the trade secret registry system to determine whether to register the digital property with the trade-secret registry. This information may additionally, or alternatively, be utilized by the entity and/or the insurer system to determine whether to seek and/or provide insurance coverage for the digital property, and/or to set policy limits and/or conditions and/or parameters for coverage of the digital property.

Additionally, or alternatively, the process 900 may include generating scheduling data representing a schedule for causing the one or more databases to be searched and causing, based at least in part on the scheduling data, the one or more databases to be searched utilizing the key words and/or language characterizations and the identifier of the author. The process 900 may also include generating additional results data based at least in part on causing the one or more databases to be searched and causing display of additional search results corresponding to the additional results data. The process 900 may also include causing display of the user-input element in association with the additional search results.

Additionally, or alternatively, the process 900 may include causing, at a time after the first search, the one or more databases to be searched for the items associated with the at least one of the key words and/or language characterizations or the identifier of the author. The process 900 may also include generating additional results data based at least in part on causing the one or more databases to be searched and causing display of additional search results corresponding to the additional results data. The process 900 may also include receiving second input data indicating that at least a portion of the additional search results corresponds to the document representing the digital property and causing, based at least in part on the second input data, display of a user interface including one or more fields associated with an insurance-policy claim related to the document.

Additionally, or alternatively, the process 900 may include sending, to at least one of the trade secret registry system or an insurer system, a first request for an insurance policy associated with the document representing the digital property. The process 900 may also include receiving, in response to the first request, a second request to indicate that the document has not been disclosed to third parties. In these examples, sending the indication that the document differs from the items associated with the search results comprises sending the indication in response to the second request.

Additionally, or alternatively, the process 900 may include generating an obfuscation value representing at least one of the key word, the identifier, the results data, and/or the indication, and sending the obfuscation value to a distributed-ledger system. The process 900 may also include receiving, from the distributed-ledger system, a block value representing a block in a blockchain associated with the distributed-ledger system where the obfuscation value has been registered.

Additionally, or alternatively, the process 900 may include generating an instance of information associated with an intranet of an entity associated with the document, the generating performed at a time associated with causing the one or more databases to be searched for the items. The process 900 may also include storing the instance of the information in a database of the one or more databases. In these examples, the instance of the information may be stored in association with a time value indicating when the instance of the information was generated.

Additionally, or alternatively, the process 900 may include determining an account identifier associated with a user account utilized to provide the input data and storing the account identifier in association with the indication in an access database.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
   one or more processors; and
   non-transitory computer-readable media storing computer-executable instructions that, when executed by the one or more processors, cause the one or more processors to perform operations comprising:
      generating a user interface configured to receive a request to register a digital property with a trade secret registry system;
      receiving a document representing the digital property;
      generating a vector representing the document from a language characterization of the document;
      determining an identifier of an author of the document;
      causing, utilizing the vector and the identifier of the author and in response to receiving the request to register the digital property with the trade secret registry system, databases to be searched for items having a similar vector to the vector, wherein a first database of the databases includes publicly-available material and a second database of the databases includes material available via an intranet of an entity associated with the document;
      generating results data including an instance of the items, the results data being ranked based at least in part on a similarity of the vector to the similar vector;
      causing display of:
         search results corresponding to the results data; and
         a user-input element configured to accept user input indicating that at least one of the items corresponds to or differs from the document representing the digital property;
      receiving input data indicating that the at least one of the items differs from the document representing the digital property;
      sending, to the trade secret registry system and based at least in part on receiving the input data, a request to register the document with the trade secret registry system, the request including a hash of the document and excluding the document itself; and
      receiving, from the trade secret registry system, data indicating that a record in the trade secret registry system has been generated, the record representing a registration of the hash of the document in the trade secret registry system and the record including a block value where the hash has been included in a blockchain.

2. The system of claim 1, wherein the results data comprises first results data, the search results comprise first search results, and the operations further comprise:
   generating scheduling data representing a schedule for causing the databases to be searched;
   causing, based at least in part on the scheduling data, the databases to be searched utilizing the language characterization and the identifier of the author;
   generating second results data based at least in part on causing the databases to be searched;
   causing display of second search results corresponding to the second results data; and
   causing display of the user-input element in association with the second search results.

3. The system of claim 1, wherein causing the databases to be searched comprises causing the databases to be searched at a first time, the results data comprises first results data, the search results comprise first search results, the input data comprises first input data, and the operations further comprise:
   causing, at a second time, the databases to be searched for the documents associated with the at least one of the language characterization or the identifier of the author;
   generating second results data based at least in part on causing the databases to be searched at the second time;
   causing display of second search results corresponding to the second results data;
   receiving second input data indicating that at least a portion of the second search results corresponds to the document representing the digital property; and
   causing, based at least in part on the second input data, display of a user interface including one or more fields associated with an insurance-policy claim related to the document.

4. The system of claim 1, the operations further comprising:
   sending, to at least one of the trade secret registry system or an insurer system, a first request for an insurance policy associated with the document representing the digital property;
   receiving, in response to the first request, a second request to indicate that the document has not been disclosed to a third party; and
   wherein sending the indication that the document differs from the items associated with the search results comprises sending the indication in response to the second request.

5. A method, comprising:
generating a user interface configured to receive a request to register a digital property with a trade secret registry system;
generating a vector representation of a document representing the digital property, the vector based at least in part on a language characterization of the document or an identifier of an author of the document;
causing, utilizing the at least one of the language characterization or the identifier and based at least in part on receiving the request to register the digital property with the trade secret registry system, one or more databases to be searched for items having a similar vector to the vector;
generating results data including an instance of the items, the results data ranked based at least in part on a similarity of the vector to the similar vector;
causing display of search results corresponding to the results data;
receiving input data indicating that the items differ from the document;
sending, to the trade secret registry system, a request to register the document with the trade secret registry system, the request including a hash of the document and excluding the document itself; and
receiving, from the trade secret registry system, data indicating that a record in the trade secret registry system has been generated, the record representing a registration of the hash of the document in the trade secret registry system and the record including a block value where the hash has been included in a blockchain.

6. The method of claim 5, wherein the results data comprises first results data, the search results comprise first search results, and the method further comprises:
generating scheduling data representing a schedule for performing searches of the one or more databases;
causing, based at least in part on the scheduling data, the one or more databases to be searched utilizing the at least one of the language characterization or the identifier;
generating second results data representing second search results from causing the one or more databases to be searched; and
causing display of a user-input element in association with the second search results, the user-input element configured to accept user input indicating that individual the second search results correspond to or differ from the document.

7. The method of claim 5, wherein causing the one or more databases to be searched comprises causing the one or more databases to be searched at a first time, the results data comprises first results data, the search results comprise first search results, the input data comprises first input data, and the method further comprises:
causing, at a second time, the one or more databases to be searched for the documents associated with the at least one of the language characterization or the identifier;
generating second results data based at least in part on causing the one or more databases to be searched at the second time;
causing display of second search results corresponding to the second results data;
receiving second input data indicating that at least a portion of the second search results corresponds to the document; and causing, based at least in part on the second input data, display of one or more input fields associated with an insurance-policy claim related to the document.

8. The method of claim 5, further comprising:
sending, to the at least one of the trade secret registry system or an insurer system, a first request for an insurance policy associated with the document;
receiving, in response to the first request, a second request to indicate that the document has not been disclosed to a third party; and
sending an indication that the document differs from the items associated with the search results in response to the second request.

9. The method of claim 5, further comprising:
generating an obfuscation value representing at least one of:
the language characterization;
the identifier;
the results data; or
the indication;
sending the obfuscation value to a distributed-ledger system; and
receiving, from the distributed-ledger system, the block value representing a block in a blockchain associated with the distributed-ledger system where the obfuscation value has been registered.

10. The method of claim 5, wherein the one or more databases includes information available via an intranet of an entity associated with the document, and the method further comprises:
generating an instance of the items at a time associated with causing the one or more databases to be searched for the items; and
storing the instance of the items in a database of the one or more databases, the instance of the items stored in association with a time value indicating when the instance of the items was generated.

11. The method of claim 5, determining the language characterization by:
generating text data representing at least one of:
text of the document;
objects depicted in image data of the document; or
speech corresponding to audio data of the document; and
performing a word-vectoring analysis the text data to generate the vector.

12. The method of claim 5, further comprising:
analyzing the results data in association with the document;
determining, based at least in part on the analyzing, that at least a portion of the results data corresponds to the document; and
generating an indication that the at least the portion of the results data corresponds to the document.

13. A system, comprising:
one or more processors; and
non-transitory computer-readable media storing computer-executable instructions that, when executed by the one or more processors, cause the one or more processors to perform operations comprising:
generating a user interface configured to receive a request to register a digital property with a trade secret registry system;
generating a vector representation of a document representing the digital property, the vector based at least in part on a language characterization of the document or an identifier of an author of the document;

causing, utilizing the at least one of the language characterization or the identifier and based at least in part on receiving the request to register the digital property with the trade secret registry system, one or more databases to be searched for items having a similar vector to the vector;

generating results data including an instance of the items, the results data ranked based at least in part on a similarity of the vector to the similar vector;

causing display of search results corresponding to the results data;

receiving input data indicating that the items differ from the document; and sending, to the trade secret registry system, a request to register the document with the trade secret registry system, the request including a hash of the document and excluding the document itself; and receiving, from the trade secret registry system, data indicating that a record in the trade secret registry system has been generated, the record representing a registration of the hash of the document in the trade secret registry system and the record including a block value where the hash has been included in a blockchain.

14. The system of claim 13, wherein the results data comprises first results data, the search results comprise first search results, and the operations further comprise:

generating scheduling data representing a schedule for performing searches of the one or more databases;

causing, based at least in part on the scheduling data, the one or more databases to be searched utilizing the at least one of the language characterization or the identifier; and causing display of a user-input element in association with second search results from causing the one or more databases to be searched, the user-input element configured to accept user input indicating that individual the second search results correspond to or differ from the document.

15. The system of claim 13, wherein causing the one or more databases to be searched comprises causing the one or more databases to be searched at a first time, the results data comprises first results data, the search results comprise first search results, the input data comprises first input data, and the operations further comprise:

causing, at a second time, the one or more databases to be searched for the documents associated with the at least one of the language characterization or the identifier;

causing display of second search results corresponding to second results data generated in response to causing the one or more databases to be searched at the second time;

receiving second input data indicating that at least a portion of the second search results corresponds to the document; and sending, to the at least one of the trade secret registry system or an insurer system, an indication that the at least the portion of the second search results corresponds to the document.

16. The system of claim 13, the operations further comprising:

sending, to at least one of the trade secret registry system or an insurer system, a first request for an insurance policy associated with the document;

receiving, in response to the first request, a second request to indicate that the document has not been disclosed to a third party; and sending an indication that the document differs from the documents associated with the search results in response to the second request.

17. The system of claim 13, the operations further comprising:

generating an obfuscation value representing at least one of:
  the language characterization;
  the identifier;
  the results data; or
  the indication;

sending the obfuscation value to a distributed-ledger system; and receiving, from the distributed-ledger system, the block value representing a block in the blockchain associated with the distributed-ledger system where the obfuscation value has been registered.

18. The system of claim 13, wherein the one or more databases includes information associated with at least one of email or voicemail stored in association with an intranet of an entity associated with the document.

19. The system of claim 13, wherein the one or more databases includes digital properties stored in association with a trade-secret registry of the trade secret registry system.

20. The system of claim 13, wherein the document includes at least one of text data, image data, or audio data.

* * * * *